(12) United States Patent
Stanley et al.

(10) Patent No.: US 11,531,571 B2
(45) Date of Patent: Dec. 20, 2022

(54) SYSTEMS AND METHODS FOR PROCESSING OF CATALOG ITEMS WITH A PLURALITY OF MODELS

(71) Applicant: Walmart Apollo, LLC, Bentonville, AR (US)

(72) Inventors: Theban Stanley, San Bruno, CA (US); Samrat Kokkula, Santa Clara, CA (US); Poornima Candoth, Milpitas, CA (US); Chhavi Yadav, Sunnyvale, CA (US); Qian Li, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 513 days.

(21) Appl. No.: 16/776,313

(22) Filed: Jan. 29, 2020

(65) Prior Publication Data
US 2021/0232944 A1    Jul. 29, 2021

(51) Int. Cl.
*G06F 9/50*      (2006.01)
*G06F 9/48*      (2006.01)
*G06N 20/00*     (2019.01)

(52) U.S. Cl.
CPC .......... *G06F 9/5044* (2013.01); *G06F 9/4881* (2013.01); *G06F 2209/501* (2013.01); *G06N 20/00* (2019.01)

(58) Field of Classification Search
None
See application file for complete search history.

(56) References Cited

U.S. PATENT DOCUMENTS 9,842,310 B2   12/2017  Lekas
10,169,649 B2   1/2019  Kochura et al.
(Continued)

FOREIGN PATENT DOCUMENTS

WO    2015066470    5/2015

OTHER PUBLICATIONS

Chaudhuri et al.; "A Smart System for Selection of Optimal Product Images in E-Commerce"; Walmart Labs, IEEE 2018; (Chaudhuri_2018.pdf; pp. 1728-1736) (Year: 2018).*
(Continued)

*Primary Examiner* — Hiren P Patel
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform receiving item data for items from a catalog, assigning a task for evaluation of the item data, storing a plurality of task jobs to a task queue, repeatedly setting, in real time, a respective processor to perform a respective evaluation model, processing the plurality of task jobs stored to the task queue by determining, in real time, whether a first evaluation model set to be performed on a first processor is capable of meeting the first evaluation criteria of the first task data, performing, on the first processor, the first evaluation model on the first task data, and transmitting first first-evaluation-model-output instructions, and repeatedly updating, in real time, the task queue. Other embodiments are disclosed herein.

20 Claims, 14 Drawing Sheets

(56) References Cited

U.S. PATENT DOCUMENTS

| | | | |
|---|---|---|---|
| 10,290,032 B2 | | 5/2019 | Koch et al. |
| 10,410,125 B1 | * | 9/2019 | Finkelstein ............. G06F 16/35 |
| 10,810,726 B2 | * | 10/2020 | Kokkula ............. G06K 9/6256 |
| 10,922,584 B2 | * | 2/2021 | Gandhi .................. G06V 10/82 |
| 10,949,774 B1 | * | 3/2021 | Valliani ................. G06N 20/20 |
| 11,036,552 B2 | * | 6/2021 | Chung .................. G06F 9/4881 |
| 11,048,975 B2 | * | 6/2021 | Gandhi .................. G06V 20/10 |
| 11,157,768 B1 | * | 10/2021 | Levinson ............. G05D 1/0246 |
| 11,216,855 B2 | * | 1/2022 | Magnani ............ G06Q 30/0627 |
| 11,232,506 B1 | * | 1/2022 | Zielnicki ............. G06Q 10/083 |
| 11,270,169 B2 | * | 3/2022 | Sun ...................... G06K 9/6292 |
| 2004/0085338 A1 | | 5/2004 | Terashima et al. |
| 2016/0314380 A1 | * | 10/2016 | Abdulkader ......... G06K 9/6269 |
| 2017/0193533 A1 | * | 7/2017 | Lai ......................... G06V 20/30 |
| 2020/0242750 A1 | * | 7/2020 | Kokkula ............... G06V 10/75 |
| 2021/0158959 A1 | * | 5/2021 | Kuroda .................. G16H 40/20 |
| 2021/0232620 A1 | * | 7/2021 | Stanley .................. G06F 16/53 |

OTHER PUBLICATIONS

Gandhi et al.; "Image Matters: Detecting Offensive and Non-Compliant Content / Logo in Product Images"; Walmart Labs, Dept. of Electrical Engineering, Technion, Israel; May 6, 2019; (Gandhi_2019.pdf; pp. 1-11) (Year: 2019).*

Tchendjou et al.; "Evaluation of Machine Learning Algorithms for Image Quality Assessment"; IEEE 2016; (Tchendjou_2016.pdf; pp. 193-194) (Year: 2016).*

* cited by examiner

400

| 401 | Receiving item data for each item of a plurality of items from a catalog comprising a set of items |

↓

| 402 | Assigning a task for evaluation of the item data for each item of the plurality of items, wherein each task for evaluation of the item data specifies respective evaluation criteria |

↓

| 403 | Storing a plurality of task jobs to a task queue, wherein the plurality of task jobs comprises task data, and wherein the task data comprise the item data and the task for evaluation of the item data |

↓

| 404 | Repeatedly setting, in real time, a respective processor of a plurality of respective processors to perform a respective evaluation model from among a plurality of evaluation models |

↓

| 405 | Processing the plurality of task jobs stored to the task queue, by determining, in real time, whether a first evaluation model of the plurality of evaluation models set to be performed on a first processor of the plurality of respective processors is capable of meeting first evaluation criteria of first task data for a first task job of the plurality of task jobs in the task queue, wherein the respective evaluation criteria comprise the first evaluation criteria, and wherein the task data comprise the first task data |

| 406 | When it is determined, in real time, that the first evaluation model set to be performed on the first processor is capable of meeting the first evaluation criteria of the first task data for the first task job in the task queue, performing, in real time |

↓

| 407 | Receiving the first task data at the first processor, wherein the first task data comprise first item data and a first task for evaluation of the second item data |

↓

| 408 | Performing, on the first processor, the first evaluation model on the first task data |

↓

| 409 | Outputting first first-evaluation-model output in accordance with the first evaluation criteria for the first task job |

↓

| 410 | Transmitting first first-evaluation-model-output instructions to a user interface to provide first first-evaluation-model-output information to the user in relation to the first first-evaluation-model output |

↓

| 411 | Repeatedly updating, in real time, the task queue according to (i) a progress of processing the plurality of task jobs by the plurality of evaluation models on the plurality of respective processors, and (ii) an addition of any subsequently received task jobs to the task queue for evaluation of subsequently received item data corresponding to subsequently received items. |

412 — When it is determined, in real time, that the first evaluation model set to be performed on the first processor is not capable of meeting the first evaluation criteria of the first task data for the first task job in the task queue, determining, in real time, whether the first evaluation model set to be performed on the first processor is capable of meeting specified second evaluation criteria of second task data for a second task job of the plurality of task jobs in the task queue, wherein the respective evaluation criteria comprise the second evaluation criteria, and wherein the task data comprise the second task data

413 — When it is determined, in real time, that the first evaluation model set to be performed on the first processor is capable of meeting the second evaluation criteria of the second task data for the second task job in the task queue performing, in real time

414 — Receiving the second task data at the first processor, wherein the second task data comprise second item data and a second task for evaluation of the second item data

415 — Performing, on the first processor, the first evaluation model on the second task data

416 — Outputting second first-evaluation-model output in accordance with the second evaluation criteria for the second task job

417 — Transmitting second first-evaluation-model-output instructions to the user interface to provide second first-evaluation-model-output information to the user in relation to the second first-evaluation-model output

418 — When it is determined, in real time, that the first evaluation model to be performed on the first processor is not capable of meeting the second evaluation criteria of the second task data for the second task job in the task queue, determining, in real time, whether the first evaluation model set to be performed on the first processor is capable of meeting any remaining evaluation criteria of any remaining task data for any remaining task job of the plurality of task jobs stored in the task queue, wherein the respective evaluation criteria comprise the any remaining evaluation criteria, and wherein the task data comprise the any remaining task data

419 — Determining, in real time, whether a second evaluation model of the plurality of evaluation models set to be performed on a second processor of the plurality of respective processors is capable of meeting the first evaluation criteria of the first task data for the first task job in the task queue

420 — When it is determined, in real time, that the second evaluation model set to be performed on the second processor is capable of meeting the first evaluation criteria of the first task data for the first task job in the task queue, performing, in real time

421 — Receiving the first task data at the second processor

422 — Performing, on the second processor, the second evaluation model on the first task data

423 — Outputting first second-evaluation-model output in accordance with the first evaluation criteria for the first task job

424 — Transmitting first second-evaluation-model-output instructions to the user interface to provide first second-evaluation-model-output information to the user in relation to the first second-evaluation-model output

425 — When it is determined, in real time, that the second evaluation model to be performed on the second processor is not capable of meeting the first evaluation criteria of the first task job in the task queue, determining, in real time, whether the second evaluation model set to be performed on the second processor is capable of meeting any remaining evaluation criteria of any remaining task data for any remaining task job of the plurality of task jobs stored in the task queue

426 — Determining whether any remaining evaluation models of the plurality of evaluation models set to be performed on any remaining processors of the plurality of respective processors are capable of meeting any evaluation criteria of the task data for any remaining task jobs of the plurality of task jobs in the task queue, wherein the respective evaluation criteria comprise the any evaluation criteria

601 – Outputting a plurality of evaluation model outputs to a plurality of output jobs in an output job queue, wherein the plurality of evaluation model outputs correspond to evaluations of the item data for each task job of the plurality of task jobs by the plurality of respective processors according to the plurality of evaluation models 602 – Repeatedly setting, in real time, a respective processor of a second plurality of processors to perform a respective post-processing evaluation from among a plurality of post-processing evaluations 603 – Processing the plurality of output jobs stored to the output job queue by determining, in real time, whether a first output job of the plurality of output jobs is compatible with the first post-processing evaluation set to be performed on the first processor of the second plurality of processors 604 – When it is determined, in real time, that the first output job is compatible with the first post-processing evaluation set to be performed on the first processor of the second plurality of processors, performing, in real time 605 – Receiving the first output job at the first processor of the second plurality of processors 606 – Performing, on the first processor of the second plurality of processors, the first post-processing evaluation of the first output job 607 – Outputting first first-post-processing data for the first output job

608 — Transmitting first first-post-processing-data instructions to update the user interface to provide first first-post-processing-data information to the user in relation to the first post-processing evaluation of the first output job 609 — Repeatedly updating, in real time, the output job queue according to (i) a progress of processing the plurality of post-processing evaluations on the second plurality of processors, and (ii) an addition of any subsequently received output jobs to the task output job queue set to be performed on the second plurality of processors

610 — When it is determined, in real time, that the first output job is not compatible with the first post-processing evaluation set to be performed on the first processor of the second plurality of processors, determining, in real time, whether a second output job of the plurality of output jobs is compatible with the first post-processing evaluation of the plurality of post-processing evaluations

611 — When it is determined, in real time, that the second output job is compatible with the first post-processing evaluation set to be performed on the first processor of the second plurality of processors, performing, in real time

612 — Receiving the second output job at the first processor of the second plurality of processors

613 — Performing, on the first processor of the second plurality of processors, the first post-processing evaluation of the second output job

614 — Outputting second first-post-processing data for the second output job

615 — Transmitting second first-post-processing-data instructions to update the user interface to provide second first-post-processing data information to the user in relation to the first post-processing evaluation on the second output job

616 — When it is determined, in real time, that the second output job is not compatible with the first post-processing evaluation set to be performed on the first processor of the second plurality of processors, determining, in real-time, whether any remaining output job of the output job queue is compatible with the first post-processing evaluation set to be performed on the first processor of the second plurality of processors

617 – Determining, in real time, whether the first output job is compatible with a second post-processing evaluation set to be performed on a second processor of the second plurality of processors 618 – When it is determined that the first output job is compatible with the second post-processing evaluation set to be performed on the first processor of the second plurality of processors, performing, in real time 619 – Receiving the first output job at the second processor of the second plurality of processors 620 – Performing, on the second processor, the second post-processing evaluation of the first output job 621 – Outputting first second-post-processing data for the first output job 622 – Transmitting first second post-processing-data instructions to update the user interface to provide first second-post-processing-data information to the user in relation to the first second-post-processing evaluation on the first output job 623 – When it is determined, in real time, that the first output job is not compatible with the second post-processing evaluation set to be performed on the second processor of the second plurality of processors, determining, in real time, whether any remaining output job of the output job queue is compatible with the second post-processing evaluation set to be performed on the second processor of the second plurality of processors 624 – Determining, in real-time, whether any output job of the output job queue is compatible with any remaining post-processing evaluations of the plurality of post-processing evaluations set to be performed on any remaining processor of the second plurality of processors

801 – Determining, in real time, whether the plurality of respective processors is adequate to accommodate the task jobs in the task job queue 802 – Selectively adding or removing one or more processors in the plurality of respective processors according to a result of determination as to whether the plurality of respective processors are adequate to accommodate the task jobs 803 – When adding one or more processors to the plurality of respective processors, setting the one or more processors to perform a selected evaluation model from among the plurality of evaluation models when adding to the plurality of respective processors

FIG. 12

SYSTEMS AND METHODS FOR PROCESSING OF CATALOG ITEMS WITH A PLURALITY OF MODELS

TECHNICAL FIELD

This disclosure relates generally to processing of catalog items with a plurality of models, such as for example a high throughput system for the large-scale processing of multiple images using a plurality of different inference models

BACKGROUND

Large data sets, such as for example images in an online retail catalog, can be processed according to different inference processing models to extract information from the image that can be useful in classifying such images. For example, images in a catalog can be processed according to inference or other models to provide for the detection of non-compliant or otherwise undesirable content in the catalog images, so as to allow for deletion and/or blocking of such material from a viewer of the catalog.

However, the processing of such large data sets with inference models can be subject to high latency, making processing very time intensive and inefficient. This result can be particularly true when a large number of different inference or other models are being applied for processing of multiple images in the retail catalog, as such processing is extremely computationally intensive and can require constant human invention to guide the processing workflow for each image with respect to each of the plurality of inference models. Accordingly, it can be difficult to efficiently analyze images in a catalog to provide information that allows for classification and/or identification of such images in a reasonable amount of time.

BRIEF DESCRIPTION OF THE DRAWINGS

To facilitate further description of the embodiments, the following drawings are provided in which:

FIG. 4 illustrates a flowchart for a method, according to certain embodiments;

FIG. 5 illustrates a further flowchart for further activities in the method of FIG. 4, according to certain embodiments;

FIG. 6 illustrates a further flowchart for further activities in the method of FIG. 4, according to certain embodiments;

FIG. 7 illustrates a further flowchart for further activities in the method of FIG. 4, according to certain embodiments;

FIG. 8 illustrates a flowchart for another method, according to certain embodiments;

FIG. 9 illustrates a further flowchart for further activities in the method of FIG. 8, according to certain embodiments;

FIG. 10 illustrates a further flowchart for further activities in the method of FIG. 8, according to certain embodiments;

FIG. 11 illustrates a further flowchart for further activities in the method of FIG. 8, according to certain embodiments;

FIG. 12 illustrates a flowchart for another method, according to certain embodiments;

Figure 1:
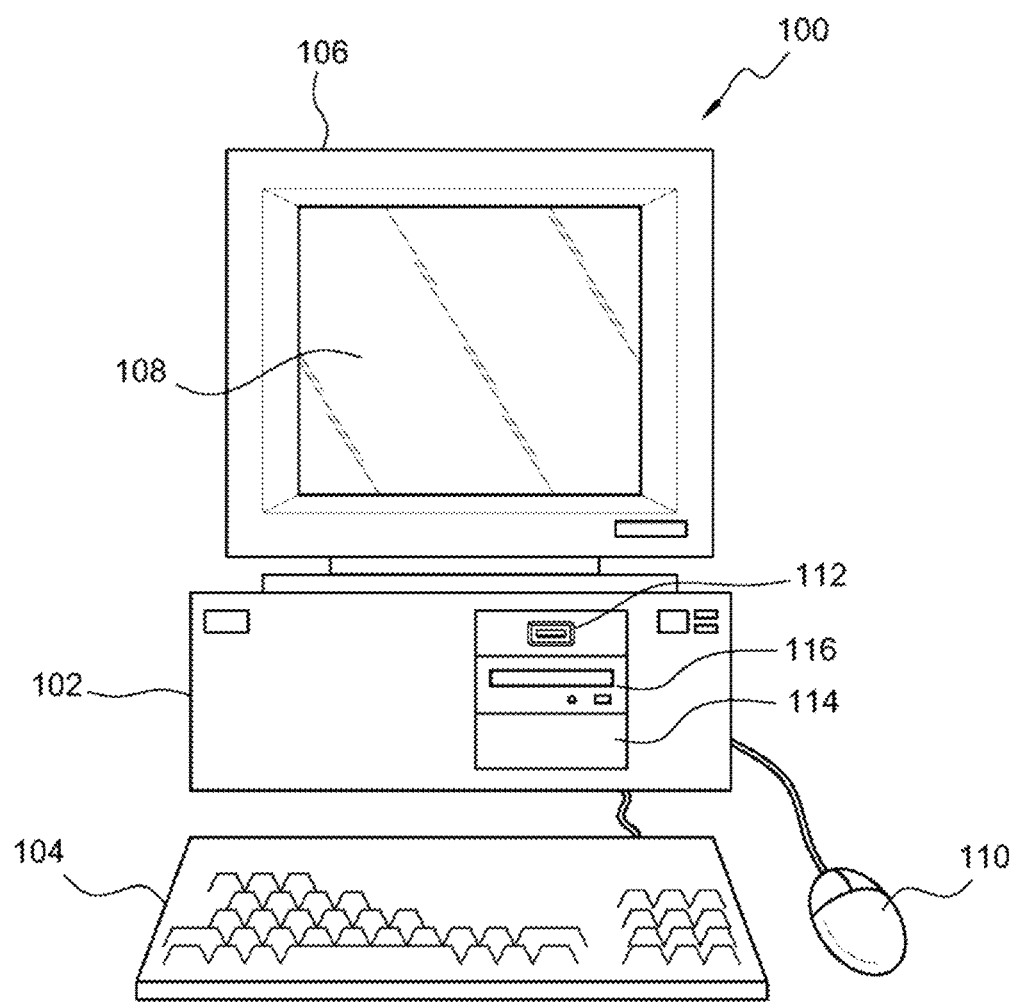
FIG. 1 illustrates a front elevational view of a computer system that is suitable for implementing various embodiments of the systems disclosed in FIGS. 3 and 13.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time"

can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform receiving item data for each item of a plurality of items from a catalog comprising a set of items, assigning a task for evaluation of the item data for each item of the plurality of items, wherein each task for evaluation of the item data specifies respective evaluation criteria, storing a plurality of task jobs to a task queue, wherein the plurality of task jobs comprises task data, and wherein the task data comprise the item data and the task for evaluation of the item data, repeatedly setting, in real time, a respective processor of a plurality of respective processors to perform a respective evaluation model from among a plurality of evaluation models, processing the plurality of task jobs stored to the task queue, by determining, in real time, whether a first evaluation model of the plurality of evaluation models set to be performed on a first processor of the plurality of respective processors is capable of meeting first evaluation criteria of first task data for a first task job of the plurality of task jobs in the task queue, wherein the respective evaluation criteria comprise the first evaluation criteria, and wherein the task data comprise the first task data, when it is determined, in real time, that the first evaluation model set to be performed on the first processor is capable of meeting the first evaluation criteria of the first task data for the first task job in the task queue, performing, in real time, receiving the first task data at the first processor, wherein the first task data comprise first item data and a first task for evaluation of the second item data, performing, on the first processor, the first evaluation model on the first task data, outputting first first-evaluation-model output in accordance with the first evaluation criteria for the first task job, and transmitting first first-evaluation-model-output instructions to a user interface to provide first first-evaluation-model-output information to a user in relation to the first first-evaluation-model output, and repeatedly updating, in real time, the task queue according to (i) a progress of processing the plurality of task jobs by the plurality of evaluation models on the plurality of respective processors, and (ii) an addition of any subsequently received task jobs to the task queue for evaluation of subsequently received item data corresponding to subsequently received items.

Various embodiments include a method. The method can be implemented via execution of computing instructions configured to run at one or more processors and configured to be stored at non-transitory computer-readable media The method can comprise receiving item data for each item of a plurality of items from a catalog comprising a set of items, assigning a task for evaluation of the item data for each item of the plurality of items, wherein each task for evaluation of the item data specifies respective evaluation criteria, storing a plurality of task jobs to a task queue, wherein the plurality of task jobs comprises task data, and wherein the task data comprise the item data and the task for evaluation of the item data, repeatedly setting, in real time, a respective processor of a plurality of respective processors to perform a respective evaluation model from among a plurality of evaluation models, processing the plurality of task jobs stored to the task queue, by determining, in real time, whether a first evaluation model of the plurality of evaluation models set to be performed on a first processor of the plurality of respective processors is capable of meeting first evaluation criteria of first task data for a first task job of the plurality of task jobs in the task queue, wherein the respective evaluation criteria comprise the first evaluation criteria, and wherein the task data comprise the first task data, when it is determined, in real time, that the first evaluation model set to be performed on the first processor is capable of meeting the first evaluation criteria of the first task data for the first task job in the task queue, performing, in real time, receiving the first task data at the first processor, wherein the first task data comprise first item data and a first task for evaluation of the second item data, performing, on the first processor, the first evaluation model on the first task data, outputting first first-evaluation-model output in accordance with the first evaluation criteria for the first task job, and transmitting first first-evaluation-model-output instructions to a user interface to provide first first-evaluation-model-output information to a user in relation to the first first-evaluation-model output, and repeatedly updating, in real time, the task queue according to (i) a progress of processing the plurality of task jobs by the plurality of evaluation models on the plurality of respective processors, and (ii) an addition of any subsequently received task jobs to the task queue for evaluation of subsequently received item data corresponding to subsequently received items.

According to certain embodiments, systems for performing inference processing models on large image sets, such as an entire ecommerce and/or online retail catalog, at scale with greater throughput, can be provided. In particular, according to certain embodiments, a plurality of deep learning models for images can be provided, such as for example deep learning models for non-compliant image detection, firearm image detection, and nudity image detection, among others. However, such deep learning models can be, in certain embodiments, very computationally intensive. Accordingly, aspects of the systems and methods herein can incorporate a task populator and a distributed task queue, with an inference infrastructure that uses CPU (central processing unit) and GPU (graphics processing unit) clusters to run different processing models, to provide for more efficient processing of the large image set in the catalog.

According to certain embodiments, inference models such as image classification models can involve a high latency of inference. According to certain embodiments, object detection networks can show even high latency compared to classification networks. Accordingly, even when image-based models have been generated for the processing of images, it can be difficult to run a plurality of such image-based models on a large number of images, such as for example on most or even all of the images in a retail catalog, due to the high latency, as the time cost of the processing is very high, and thus can make the benefit-cost ratio unacceptably low. In certain embodiments, the systems and methods herein may thus address an issue in running image models on a significant portion and even the entire catalog, with a manageable amount of time.

According to certain embodiments, an overall workflow of the systems and methods described herein can generally start with retrieving data from the retail catalog data (e.g., key information such as image URLs, product identification number, and item identification number), making inferences on the images, and finally sending the prediction for post-processing, such as before publishing to either a manual review application (for reviewers) or to a storage such as an object/data structure that contains information pertaining to products in the retail catalog (for others to fetch and use the results). A challenge with this workflow is in making the overall workflow fast. According to certain embodiments, the workflow can be understood to consist of several sub-tasks that can be connected in a series. Accordingly, at least in theory, it is possible to work out solutions where each process in the workflow does one subtask, with each individual piece being optimized for efficiency thereof. However, even such a workflow can pose issues in terms of requiring constant human intervention to expedite flow between the process steps. Accordingly, embodiments of the systems and methods described herein can provide for a workflow in which the large-scale data processing, such as a catalog sweep to identify content in catalog images, is capable of running for days or even weeks with minimal human involvement. According to certain embodiments, communication and data exchanges across different programs that can be located on different processing systems and/or devices is provided.

Figure 14:
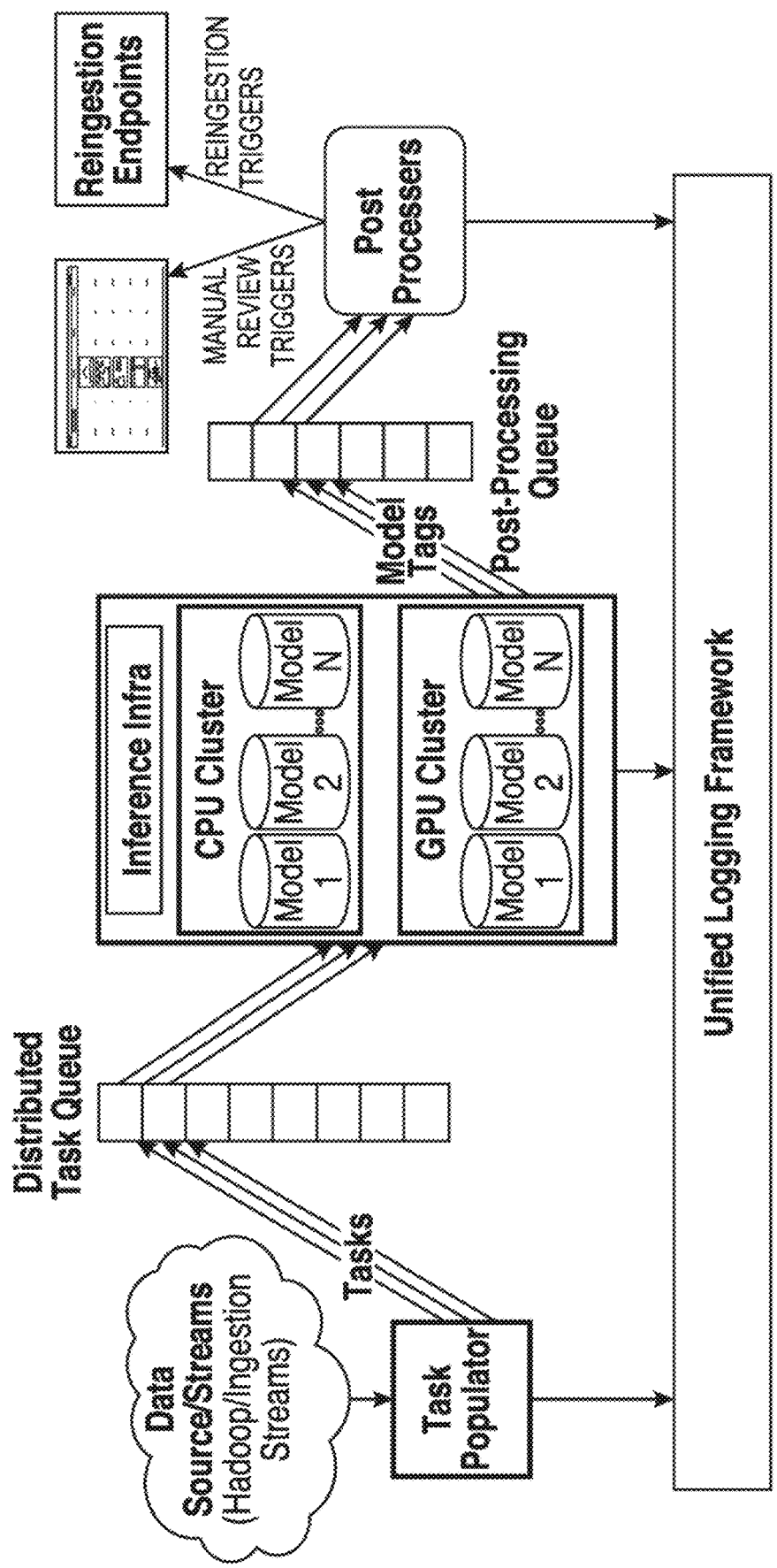
FIG. 14 illustrates an embodiment of an architecture for the system and method herein, according to certain embodiments.

Referring to FIG. 14, an embodiment is shown of an architecture suitable for the systems and/or methods described herein. According to one embodiment, the system comprises a data source and/or data stream, such as a Hadoop and/or ingestion stream, that is capable of providing data for analysis. For example, in one embodiment, a distributed data framework (e.g., Spark) is used to pull catalog data from Hive tables on storage clusters. Spark is capable of using resilient distributed dataset (RDD) methodology, and performs complex analytics in memory, and so at least in certain embodiments may be capable of retrieving a large amount of data. According to one embodiment, once the data has been retrieved, it may be moved by a user to a cloud management and application lifecycle management platform (e.g., via a Unix command), although in certain other embodiments the data may also automatically be moved. In certain embodiments a transfer "manually" performed by a user (e.g., via Unix command) may be sufficiently fast for this step, as the data transfer is simply from one machine to another (and not among multiple machines). Nonetheless, according to certain aspects herein, the overall workflow does not otherwise involve such "manual" transfers, or has only minimal occurrences of such "manual" transfers, and instead automatic data exchange is provided throughout the workflow.

According to certain embodiments, a task populator is provided as a part of the systems and methods described herein. The task populator may be capable of populating data and sending it to a temporary data storage, which may be a distributed queueing system and/or publisher-subscriber system (such as a Kafka topic), at a pre-defined pace. According to some embodiments, one or more inference machines are further provided that are capable of listening to the distributed queueing system and/or publisher-subscriber system (e.g. Kafka topic) and waiting for new data. As shown in FIG. 14, the task populator is capable of assigning tasks to a distributed task queue, which is in communication with an inference infrastructure.

According to certain embodiments, the systems and methods herein comprise an inference infrastructure, comprising a plurality of processors capable of processing the tasks assigned to the distributed task queue. For example, the inference infrastructure can comprise one or more CPU clusters and/or one or more GPU clusters that are capable of evaluating data with respect to one or inference models. According to certain embodiments, instead of downloading one image at a time, it is possible to download several images at a same time, and distribute the work to different threads and/or CPUs and/or GPUs. Furthermore, once the time on one machine has been optimized, the machine can be scaled up and more CPUs and/or GPUs can be added. In some embodiments, scaling out the architecture (i.e. adding more machines in parallel) can be relatively easy as machines can be temporarily borrowed, the same code can be deployed, and the can listed to the same distributed queueing system and/or publisher-subscriber system (e.g. Kafka topic). In some embodiments, processing with 10 machines and 10 million images a day could become 1 million images a day for each machine. Moreover, we can open up different docker images on the same machine, each working on the same or different models to fully use the CPU and/or GPU resource.

According to one embodiment, the distributed queueing system and/or publisher-subscriber system (e.g. Kafka topic) plays the role of handling data exchanges. For example, if a set of machines are provided the do model inference in a parallel fashion, then each machine can be instructed to work on a unique set of data, unless the job on the machine fails. However, such a parallel system may need a way to distribute the data and collect the results from all of the parallel processing machines. According to certain embodiments, a durable messaging system comprising the distributed queueing system and/or publisher-subscriber system (e.g., Kafka) is provided that exchanges data between applications and servers. For example, referring to FIG. 14, two distributed queueing systems and/or publisher-subscriber systems (e.g., Kafka topics) can be provided to act as transit centers where the data are temporarily stored, with producers and consumers at different components being subscribed to the topics to transport data through the workflow. According to the embodiment as shown in FIG. 14, the first producer is set up on the task populator machine to send data chunks to the first distributed queueing system and/or publisher-subscriber system (e.g., first Kafka topic) (distributed task queue), where the data/messages are aligned in a queue. Furthermore, both producers and consumers can be set up on inference clusters, so that each machine in the inference cluster gets data from the first distributed queueing system and/or publisher-subscriber system (e.g., first Kafka topic), and when the model inference is completed, each machine in the inference cluster sends a signal back to the first distributed queueing system and/or publisher-subscriber system (e.g., first Kafka topic) to indicate completion thereof, and further transmits the model results to a second distributed queueing system and/or publisher-subscriber system (e.g., second Kafka topic) (the post-processing queue). According to the embodiment as shown in FIG. 14, the consumers set up on post-processing clusters receive the model results (e.g., model tags) produced by the inference clusters for further processing thereof.

According to certain embodiments, upon receiving the model results produced by the inference clusters at the post-processing clusters, the system can run an ADD command (to provide a new URL (uniform resource locator)) or an UPDATE command (for existing URL) action on the database. As with the inference cluster of the inference infrastructure, the processors used for post-processing can also be deployed as a cluster to provide high processing speed. According to the intended analysis and/or result of the inference processing, the post-processing cluster can be capable of actions such as sending the inference model evaluation results to a manual review application, or triggering reingestion of the data to the object/data structure that holds information pertaining to products in the retail catalog.

In some embodiments of the system and/or method, even if individual pieces of the workflow are set on different clusters, a unified logging framework can be capable of logging time and the number of images that are processed through the workflow successfully. In certain example, logging can be important to troubleshooting, as it can help identify where any discrepancy occurs, and which component of the system is slowing down workflow progress.

According to some embodiments, the systems and methods described herein provide for optimization of inference model processing. For example, according to certain embodiments herein, the system and/or method can be capable of downloading image data from dozens of URLs at a time. Accordingly if one connection is stalled, for example because a program has asked for an image from a URL and is waiting until the service replies, the connection can be suspended without holding up the other functions of the system and/or method (i.e., asynchronous programming can be provided). Furthermore, in certain embodiments, the model inference can be either one or more of CPU and GPU-based work. Accordingly in certain embodiments, to parallelize the work, in the case of CPUs, independent processes can be opened on different CPU cores to make predictions at the same time. In the case of GPUs, in certain embodiments, only one processor is provided, but the work is distributed across the GPU (e.g., parallel processing).

Figure 2:
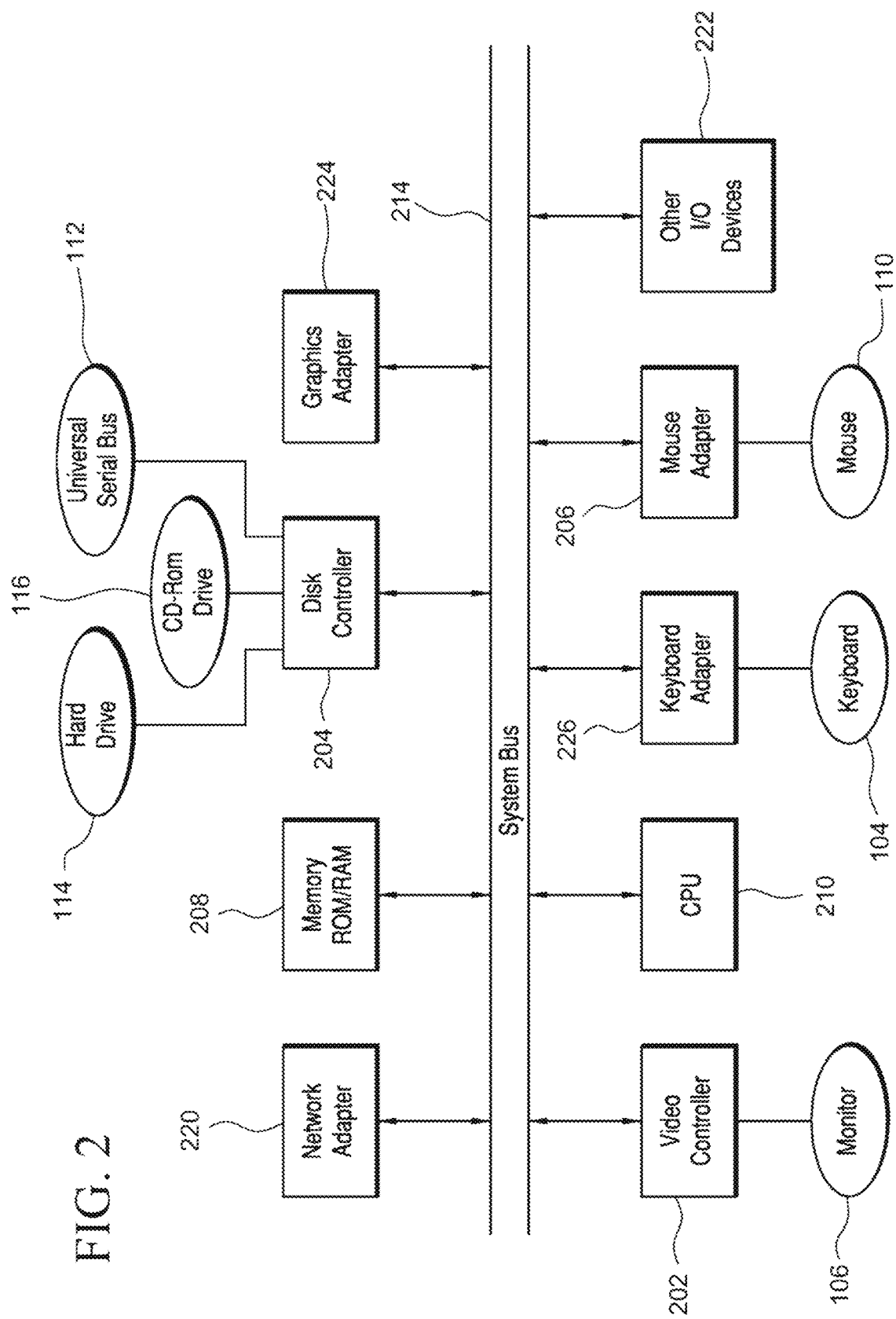
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
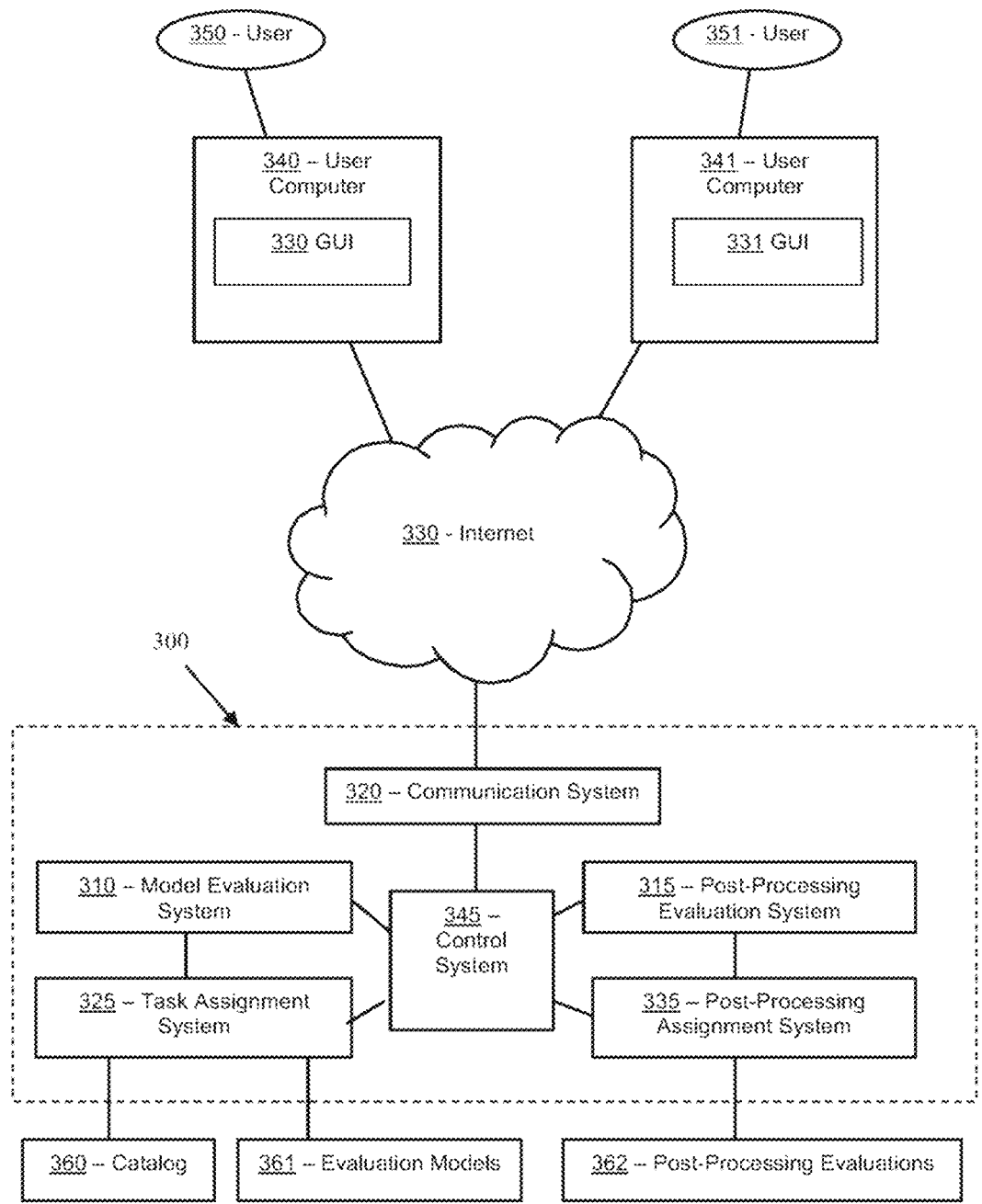
FIG. 3 illustrates a representative block diagram of a system, according to an embodiment.

Turning ahead in the drawings, FIG. 3 illustrates a block diagram of a system 300 that can be employed for processing of catalog items with a plurality of models, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a model evaluation system 310, a task assignment system 325, a post-processing evaluation system 315, a post-processing assignment system 335, a control system 345 and a communication system 320. Model evaluation system 310, task assignment system 325, post-processing evaluation system 315, post-processing assignment system 335, control system 345 and communication system 320 can each be a computer system, such as computer system 100 (FIG. 1), as described above, and can each be a single computer, a single server, or a cluster or collection of computers or servers, or a cloud of computers or servers. In another embodiment, a single computer system can host each of two or more of model evaluation system 310, task assignment system 325, post-processing evaluation system 315, post-processing assignment system 335, control system 345 and communication system 320. Additional details regarding model evaluation system 310, task assignment system 325, post-processing evaluation system 315, post-processing assignment system 335, control system 345 and communication system 320 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 330, 331. In the same or different embodiments, GUI 330, 331 can be part of and/or displayed by user computers 340, 341, which also can be part of system 300. In some embodiments, GUI 330, 331 can comprise text and/or graphics (image) based user interfaces. In the same or different embodiments, GUI 330, 331 can comprise a heads up display ("HUD"). When GUI 330, 331 comprises a HUD, GUI 330, 331 can be projected onto glass or plastic, displayed in midair as a hologram, or displayed on monitor 106 (FIG. 1). In various embodiments, GUI 330, 331 can be color or black and white. In many embodiments, GUI 330, 331 can comprise an application running on a computer system, such as user computers 340, 341. In the same or different embodiments, GUI 330, 331 can comprise a website accessed through internet 330. In some embodiments, GUI 330, 331 can comprise an eCommerce website. In the same or different embodiments, GUI 330, 331 can be displayed as or on a virtual reality (VR) and/or augmented reality (AR) system or display.

In some embodiments, communication system 320 can be in data communication through Internet 330 with user computers (e.g., 340, 341). In certain embodiments, user computers 340, 341 can be desktop computers, laptop computers, smart phones, tablet devices, and/or other endpoint devices. Communication system 320 can host one or more websites and/or communicate with one or more websites. For example, communication system 320 can communicate with user computers 340, 341 to provide information on a result of processing data with one or more evaluation models.

In many embodiments, model evaluation system 310, task assignment system 325, post-processing evaluation system 315, post-processing assignment system 335, control system 345 and communication system 320 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) model evaluation system 310, task assignment system 325, post-processing evaluation system 315, post-processing assignment system 335, control system 345 and communication system 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of model evaluation system 310, task assignment system 325, post-processing evaluation system 315, post-processing assignment system 335, control system 345 and communication system 320. In a similar manner, the processing module(s) and the memory storage module(s) can be local and/or remote to each other.

In many embodiments, model evaluation system 310, task assignment system 325, post-processing evaluation system 315, post-processing assignment system 335, control system 345 and communication system 320 can be configured to communicate with one or more user computers 340 and 341. In some embodiments, user computers 340 and 341 also can be referred to as reviewer computers. For example, in some embodiments, the user computers 340 and 341 comprise computers used to manually evaluate the results of processing by the system. In some embodiments, model evaluation system 310, task assignment system 325, post-processing evaluation system 315, post-processing assignment system 335, control system 345 and communication system 320 can communicate or interface (e.g., interact) with one or more manual review computers (such as user computers 340 and 341) through a network or internet 330. Internet 330 can be an intranet that is not open to the public. (The intranet can be part of system 300.) Accordingly, in many embodiments, model evaluation system 310, task assignment system 325, post-processing evaluation system 315, post-processing assignment system 335, control system 345 and communication system 320 (and/or the software used by such systems) can refer to a back end of system 300 operated by an operator and/or administrator of system 300, and user computers 340 and 341 (and/or the software used by such systems) can refer to a front end of system 300 used by one or more users 350, 351, respectively, e.g. to evaluate the result of data processing performed by the system. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, model evaluation system 310, task assignment system 325, post-processing evaluation system 315, post-processing assignment system 335, control system 345 and communication system 320 can also be configured to communicate with one or more databases. The one or more databases can comprise a catalog 360 and/or product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). The one or more databases can also comprise one or more databases 361 comprising models used for evaluation of data by the system 300, such as inference models. The one or more databases can also comprise one or more databases 362 comprising post-processing evaluations used for post processing of the data Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between model evaluation system 310, task assignment system 325, post-processing evaluation system 315, post-processing assignment system 335, control system 345 and communication system 320, and/or the one or more databases 360, 361, 362 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for more efficient processing and workflow in evaluating data for certain content, such as image evaluation to identify certain content that may be non-compliant and/or objectionable, e.g. for removal of such content. These techniques described herein can provide a significant improvement over conventional approaches of performing workflow processes in a serial fashion, as the techniques may allow for a faster and more highly automated workflow that is less dependent on the overall speed of any one step in the workflow.

In a number of embodiments, the techniques described herein can advantageously provide an improvement to an administrator and/or reviewing seeking to process data, such as image data, to identify certain content therein. For example, the techniques described herein may be capable of providing a continuous flow of content to such reviewer, without excessive processing delays. The techniques described herein may also allow a reviewer to process data simultaneously using multiple different model evaluations and/or post-processing evaluations, without requiring individual setting of parameters for each step in the workflow for every item of data processed, and while providing a streamlined and efficient parallel flow of work via the system and/or method.

In many embodiments, the techniques described herein can be used continuously at a scale that cannot be reasonably performed using manual techniques or the human mind. For example, the parallel processing described herein can in certain embodiments involve the nearly simultaneous transfer of numerous different data sets between processors, and the communication of status of processing of these numerous data sets, along different steps in the workflow. Furthermore, according to embodiments herein, the evaluation models used to evaluate the data can comprise inference models obtained from machine learning systems, which comprise complex models derived via application of computer-specific learning to certain predetermined problems.

In many embodiments, the techniques described herein can solve a technical problem in the field of data processing that cannot be solved outside the context of computer networks. Specifically, the techniques described herein cannot be used outside the context of computer networks due to the lack of ability to parallel process data with the requisite speed and accuracy that is not otherwise available outside of a computer system and/or network.

Turning ahead in the drawings, FIGS. 4-7 illustrate flow charts for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as Model evaluation system 310, task assignment system 325, post-processing evaluation system 315, post-processing assignment system 335, control system 345 and communication system 320 (FIG. 3). The processing module(s) can be similar or identical to the processing module(s) described above with respect to computer system 100 (FIG. 1).

In many embodiments, method 400 (FIGS. 4-7) can comprise an activity 401 (FIG. 4) of receiving item data for each item of a plurality of items from the catalog comprising a set of items. The catalog can comprise, for example, a catalog of all products available for purchase from a retailer, such as an online retailer and/or ecommerce retailer. The plurality of items in the catalog can comprise, for example, any of the product available from the catalog, such as products offered for sale by the online and/or ecommerce retailer. According to certain embodiments, the item data for each item of the plurality of items can comprise, for example, data associated with the particular item in the catalog, such as for example any of text and/or image data, as well as any other data stored and/or available for the item. In one embodiment, the item data comprises one or more of image data for the plurality of items, image web addresses for the plurality of items, item identification numbers for the plurality of items, or item description for the plurality of items, and/or any combination thereof. For example, in one embodiment, the item data can comprise image data of the item, such as image data depicting the item and/or use thereof. As another example, in one embodiment, the item data can comprise a text description of the item, and/or other text associated with the item. In certain embodiments, the item data comprises data that is being targeted to determine whether it contains content that might be non-compliant and/or unacceptable to a customer of the retailer, such as for example content that uses non-compliant language, explicit images, and/or other display of objectionable material, in order that the non-compliant and/or unacceptable material associated with the item can be identified and removed. In one embodiment, the activity 401 (FIG. 4) comprises receiving, at the task assignment system 325 (FIG. 3) the item data for each of the plurality of items from a catalog database 360 storing the catalog.

In certain embodiments, the method 400 (FIGS. 4-7) can continue by an activity 402 (FIG. 4) of assigning a task for evaluation of the item data for each item of the plurality of items, wherein each task for evaluation of the item data specifies respective evaluation criteria. For example, according to certain embodiments, one or a plurality of different tasks may be assigned to each item data that has been received. The task for evaluation of the item data can correspond to a certain type of processing and/or evaluation that is intended to be performed on the item data. For example, the task may be to evaluate the item data for the presence of certain images and/or text, such as for example to evaluate for objectionable images, and/or for the presence of obscenities. The task for evaluation specifies the evaluation criteria that is to be used for each task, for example what evaluation is to be performed on the item data, and/or what output is intended to be obtained from the evaluation. According to certain embodiments, a plurality of tasks may be assigned to the same item data for a single item. For example, the item data corresponding to a single item may be subject to more than one type of image evaluation, such as evaluation for both explicit images and images of firearms. The evaluation criteria for each task can comprise criteria specifying, for example, a type of evaluation model that is intended to be run on the item data in order to complete the task, a type of output data that is intended to be output from evaluation of the item data via completion of the task, and/or the type of data included in the item data, as well as combinations thereof.

In one embodiment, the activity 402 (FIG. 4) comprises assigning a task for evaluation by the task assignment system 325 (FIG. 3) of the system 300. For example, the task assignment system 325 (FIG. 3) can be set to assign certain types of tasks to certain types of item data, and/or to certain types of items. In one embodiment, the task assignment system 325 is instructed to assign certain tasks to item data by the user 350, 351 (e.g., a reviewer). For example, the user 350, 351 may set the types of tasks to be performed for certain types of item data, and/or may flag certain item data for specific processing, among other methods of determining the tasks to be performed. According to certain embodiments, the assignment of tasks for evaluation is performed automatically via predefined algorithms. According to other embodiments, the assignment of tasks can be performed by receiving instructions from the user 350, 351 (e.g. reviewer) at the task assignment system 325 to perform a specified task on the item data.

In certain embodiments, the method 400 (FIGS. 4-7) can continue by an activity 403 (FIG. 4) of storing a plurality of task jobs to a task queue, wherein the plurality of task jobs comprises task data, and wherein the task data comprise the item data and the task for evaluation of the item data. According to certain embodiments, the task jobs stored to the task queue comprise the item data that is intended to be evaluated to obtain certain output, and comprises the task for evaluation that specifies the evaluation criteria to be used in the evaluation of the item data. According to certain embodiments, each task job can comprise one or a plurality of item data, and can comprise one or a plurality of tasks for evaluation of the item data. In some embodiments, the task queue can comprise a distributed task queue that stores the task jobs across multiple machines and/or devices. The plurality of task jobs stored to the task queue may be repeatedly updated, for example following assignment of new tasks, and/or following retrieval of tasks for evaluation from the task queue. Referring to FIG. 3, according to certain embodiments the activity 403 (FIG. 4) can be performed by the task assignment system 325 (FIG. 3), which is capable of assigning task jobs to the task queue. In some embodiments, the control system 345 (FIG. 3) may be configured to monitor and track task jobs in the task queue, for example to provide information to the task assignment system 325 about assigning new task jobs to the task queue, to provide information to the model evaluation system 310 regarding tasks available for processing and/or evaluation in the task queue, and/or to confirm processing status of task jobs that are being processed by the model evaluation system 310.

In certain embodiments, the method 400 (FIGS. 4-7) can continue by an activity 404 (FIG. 4) of repeatedly setting, in real time, a respective processor of a plurality of respective processors to perform a respective evaluation model from among a plurality of evaluation models. The respective processor can be set to perform a predetermined evaluation model for evaluating the task data to obtain a predetermined output. According to certain embodiments, a plurality of respective processors can be set to each perform one of a plurality of different respective evaluation models, such as for example a different evaluation model for each processor. In some embodiments, a first set of processors can perform a first evaluation model, and a second and further set of processors can perform second and further evaluation models. The evaluation models can be, for example, one or more inference models obtained via machine learning techniques. According to one embodiment, the evaluation models can be one or more inference models for the processing and/or evaluation of images. In certain embodiments, the respective processors can be repeatedly set, in real time, to perform the respective evaluations, such that the processors can be re-set according to availability of the processor to perform a new evaluation model, and/or to provide for evaluation of new and/or subsequent evaluation models by the respective processors. In some embodiments, by setting each of the respective processors in the plurality of processors to perform the respective evaluation model, a plurality of the processors can be available for processing and/or evaluation of the task data according to the plurality of different evaluation models, thus providing for a variety of different analysis and/or outputs from processing of the task jobs. According to certain embodiments, the plurality of respective processors to which the evaluation models can be set can comprise one or more of CPUs, GPUs or combinations thereof.

Referring to FIG. 3, in one embodiment the activity 404 (FIG. 4) can be performed by the model evaluation system 310 (FIG. 3) which repeatedly sets, in real time, respective processors to perform the respective evaluation models from among a plurality of evaluation models. In some embodiments, the setting of the respective processors to perform the respective evaluation models can be done in conjunction with control system 345 (FIG. 3), which can be configured to receive instructions from users 350, 351 (e.g., reviewers) with respect to which respective evaluation models are intended to be performed with respect to the task jobs, and or for which types of task jobs. In certain embodiments, the respective evaluation models that can be set to the respective processors can be retrieved from an evaluation model database 361 (FIG. 3). For example, the control system 345 (FIG. 3) can be configured to retrieve evaluation models from the evaluation model database 361 in response to instructions from the users 350, 351 (e.g. reviewers), and communicate the evaluation models to the model evaluations system 310.

In certain embodiments, the method 400 (FIGS. 4-7) can continue by an activity 405 (FIG. 4) of processing the plurality of task jobs stored to the task queue, by determining, in real time, whether a first evaluation model of the plurality of evaluation models set to be performed on a first processor of the plurality of respective processors is capable of meeting first evaluation criteria of first task data for a first task job of the plurality of task jobs in the task queue, wherein the respective evaluation criteria comprise the first evaluation criteria, and wherein the task data comprise the first task data. That is, according to certain embodiments, the first evaluation model set to be performed on a first processor is compared with the first evaluation criteria of the first task job to determine whether it is suitable to perform the first task job. For example, it can be determined whether the first evaluation model is capable of performing an evaluation specified by the first evaluation criteria, whether it is capable of processing the type of item data contained in the task data, and/or whether it is capable of providing the output specified by the first evaluation criteria. For example, for first evaluation criteria that specifies evaluation of item data comprising image data, with an inference model capable of identifying potentially objectionable content in the image, it can be determined whether the first evaluation model set to the first processor is capable of performing the specified inference model, and/or whether it is capable of evaluating image data, and/or whether it is capable of providing an output in relation to identification of potentially objectionable content in the image. Referring to FIG. 3, in certain embodiments, the activity 405 can be performed by the model evaluation system 310 (FIG. 3), for example in collaboration with the control system 345, by communicating with the task assignment system 325 to evaluate and compare the evaluation criteria of task jobs stored in the task queue, and determine whether evaluation models set to each of the respective processors are capable of meeting the evaluation criteria.

In certain embodiments, the method 400 (FIGS. 4-7) can continue after activity 405 (FIG. 4) with an activity 406 (FIG. 5) of when it is determined, in real time, that the first evaluation model set to be performed on the first processor is capable of meeting the first evaluation criteria of the first task data for the first task job in the task queue, performing, in real time the activities 407-410 (FIG. 5) for processing the first task data according to the first evaluation model, and transmitting output instructions to a user interface 330, 331 (FIG. 3). According to some embodiments, the activity 406 (FIG. 4) and activities 407-409 (FIG. 4) can be performed by the model evaluation system 310 (FIG. 3) as described further herein, with activity 410 (FIG. 4) of transmitting instructions being performed by communication system 320 (FIG. 3), and optionally in collaboration with the control system 345 (FIG. 3).

Referring to FIG. 5, according to certain embodiments, when it is determined that the first evaluation model set to be performed on the first processor is capable of meeting the first evaluation criteria, the method 400 (FIGS. 4-7) can continue by the activity 407 (FIG. 5) of receiving the first task data at the first processor, wherein the first task data comprise first item data and a first task for evaluation of the second item data. That is, the first data of the first task job stored in the task queue can be retrieved and sent for processing and/or evaluation to the first processor. According to embodiments herein, the method 400 (FIGS. 4-7) can continue by the activity 408 (FIG. 5) of performing, on the first processor, the first evaluation model on the first task data. For example, the first evaluation model that has been determined to meet the evaluation criteria for the first task data is performed to evaluate the first task data and provide evaluation output. The method 400 (FIGS. 4-7) can further continue by the activity 409 (FIG. 5) of outputting first first-evaluation-model output in accordance with the first evaluation criteria for the first task job. For example, for a first evaluation model and first task job that specify evaluation of image data by an inference model to determine whether the image data contains potentially objectionable content, the first first-evaluation-model output can comprise information as to whether or not such potentially objectionable content was identified in evaluation of the first task data by the first evaluation model, and the nature of such potentially objectionable content. According to certain embodiments, the activities 407-409 (FIG. 5) may be performed by the model evaluation system 310 (FIG. 3), for example in coordination with the control system 345 to receive first task data from the task queue, and provide the first first-evaluation model output in relation to the evaluation of the first task data with the first evaluation model.

According to embodiments herein, the method 400 (FIGS. 4-7) can continue by the activity 410 (FIG. 5) of transmitting first first-evaluation-model-output instructions to a user interface 330, 331 (FIG. 3) to provide first first-evaluation-model-output information to a user 350, 351 (e.g., reviewer) (FIG. 3) in relation to the first first-evaluation-model output. For example, the first first-evaluation-model-output instructions can be provided to the user 350, 351 (FIG. 3) to provide for review of the output, and determination as to next steps in processing. For example, the user 350, 351 (FIG. 3) can make determinations with respect to removal or blocking of content contained in the item data and associated with the item in the catalog, in a case where objectionable content has been identified by evaluation with the first evaluation model. According to one embodiment, the first first-evaluation-model output can be subject to further post-processing prior to transmitting of the first first-evaluation-model-output instructions to the user interface 340, 341 (FIG. 3), as described further herein. In certain embodiments, the activity 410 (FIG. 5) of transmitting the first first-evaluation-model output instructions to the user interface 330, 331 (FIG. 3) can be performed by the communication system 320 (FIG. 3) which communicates model output instructions in relation to output from the model evaluation system 310, optionally in coordination with the control system 320. According to another embodiment, post-processing evaluations are performed on the output from the model evaluation system 310 (FIG. 3), for example by the post-processing assignment system 335 (FIG. 3) and post-processing evaluation system 315 (FIG. 3), and provide first first-evaluation model output instructions to the communication system 320 in relation to first first-evaluation model output generated by the model evaluation system 345.

According to certain embodiments, the control system 345 (FIG. 3) can provide for communication between any one or more of the model evaluation system 310, task assignment system 325, post-processing evaluation system 315, post-processing assignment system 335, communication system 320, and/or catalog database 360, evaluation model database 361, and post-processing evaluations database, to provide the real-time updating and/or setting of parameters for performing the activities of the method.

According to embodiments herein, the method 400 (FIGS. 4-7) can continue by the activity 411 (FIG. 5) of repeatedly updating, in real time, the task queue according to (i) a progress of processing the plurality of task jobs by the plurality of evaluation models on the plurality of respective processors, and (ii) an addition of any subsequently received task jobs to the task queue for evaluation of subsequently received item data corresponding to subsequently received items. According to one embodiment, the task queue can be repeatedly updated in real time by communication between the model evaluation system 310 (FIG. 3) and task assignment system 325 (FIG. 3), for example by control system 345 (FIG. 3), to determine whether processing of a task job in the task queue has been completed by the processor set to perform the first evaluation model on the first task data. For example, when processing of the task job in the task queue has been completed, the task job can be deleted from the task queue. Furthermore, as another example, completed task jobs in the task queue can be replaced with new task jobs, specifying new item data and new evaluation criteria that has been assigned for processing with one of the plurality of evaluation models. According to certain embodiments, by repeatedly updating the task queue in real time, the progress of task jobs can be monitored, such that the task queue can be updated with new task jobs for performing by the respective processors, and task jobs that have been completed can be removed from the task queue to allow for the addition of new task jobs to the task queue. In the same or different embodiments, new task jobs can be added to the task queue without having completed and/or removed any existing task job in the task queue.

According to further embodiments herein, the method 400 (FIGS. 4-7) can continue after activity 411 (FIG. 5) with activity 412 (FIG. 6) of when it is determined, in real time, that the first evaluation model set to be performed on the first processor is not capable of meeting the first evaluation criteria of the first task data for the first task job in the task queue, determining, in real time, whether the first evaluation model set to be performed on the first processor is capable of meeting specified second evaluation criteria of second task data for a second task job of the plurality of task jobs in the task queue, wherein the respective evaluation criteria comprise the second evaluation criteria, and wherein the task data comprise the second task data. That is, when it is determined at activity 405 (FIG. 4) that the first evaluation model set to be performed on the first processor does not meet the criteria of the first task job in the task queue, the method moves on to the second task job in the task queue to determine whether the first evaluation model set to be performed on the first processor meets the evaluation criteria for that second task job. According to embodiments herein, the method can continue to review the plurality of task jobs in the task queue (e.g., a third task job, fourth task job, etc., up to an n-th task job stored in the task queue) until a task job is located that has evaluation criteria that can be met by the first evaluation set to be performed on the first processor.

According to certain embodiments, the evaluation criteria set for each task job can comprise, for example, criteria as to which evaluation model is to be used to evaluate a task job, and the type of output that is intended to be provided. Accordingly, when an evaluation model set to be performed on a processor is not of the type that is specified in the evaluation criteria for a task job, for example when it does not provide the type of inference evaluation model that is specified in the evaluation criteria for the task job, and/or is not capable of providing the type of output specified by the evaluation criteria, the task job is not accepted for processing by the evaluation model set to be performed on the processor, and instead another suitable match between the task jobs in the task queue and evaluation models set to be performed by the processors, is sought.

According to embodiments herein, the method 400 (FIGS. 4-7) can further continue by activity 413 (FIG. 6) of when it is determined, in real time, that the first evaluation model set to be performed on the first processor is capable of meeting the second evaluation criteria of the second task data for the second task job in the task queue performing, in real time, the activities 414-417 (FIG. 6) for processing the second task data according to the first evaluation model, and transmitting output instructions to a user interface 330, 331 (FIG. 3). That is, the method 400 (FIGS. 4-7) can repeat the activities 407-410 (FIG. 5), but with the processing of the second task data with the first evaluation model instead of the first task data. According to some embodiments, the activity 413 and activities 414-417 can be performed by the model evaluation system 310 (FIG. 3) as described further herein, with activity 417 of transmitting instructions being performed by communication system 320 (FIG. 3), and optionally in collaboration with the control system 345 (FIG. 3).

Referring to FIG. 6, according to certain embodiments, when it is determined that the first evaluation model set to be performed on the first processor is capable of meeting the second evaluation criteria, the method 400 (FIGS. 4-7) can continue by the activity 414 (FIG. 6) of receiving the second task data at the first processor, wherein the second task data comprise second item data and a second task for evaluation of the second item data. That is, the second data of the second task job stored in the task queue can be retrieved and sent for processing and/or evaluation to the first processor. According to embodiments herein, the method 400 (FIGS. 4-7) can continue by the activity 415 (FIG. 6) of performing, on the first processor, the first evaluation model on the second task data. For example, the first evaluation model that has been determined to meet the evaluation criteria for the second task data is performed to evaluate the second task data and provide evaluation output. The method 400 (FIGS. 4-7) can further continue by the activity 416 (FIG. 6) of outputting second first-evaluation-model output in accordance with the second evaluation criteria for the second task job. For example, for a first evaluation model and second task job that specify evaluation of image data by an inference model to determine whether the image data contains potentially objectionable content, the second first-evaluation-model output can comprise information as to whether or not such potentially objectionable content was identified in evaluation of the second task data by the first evaluation model, and the nature of such potentially objectionable content. According to certain embodiments, the activities 414-416 (FIG. 6) may be performed by the model evaluation system (FIG. 3), for example in coordination with the control system 345 (FIG. 3) to receive second task data from the task queue, and provide the second first-evaluation model output in relation to the evaluation of the second task data with the first evaluation model.

According to embodiments herein, the method 400 (FIGS. 4-7) can continue by the activity 417 (FIG. 6) of transmitting second first-evaluation-model-output instructions to the user interface 330, 331 (FIG. 3) to provide second first-evaluation-model-output information to the user 350, 351 (e.g., reviewer) (FIG. 3) in relation to the second first-evaluation-model output. For example, the second first-evaluation-model-output instructions can be provided to the user 350, 351 (FIG. 3) to provide for review of the output, and determination as to next steps in processing. For example, the user 350, 351 can make determinations with respect to removal or blocking of content contained in the item data and associated with the item in the catalog, in a case where objectionable content has been identified by evaluation with the first evaluation model. According to one embodiment, the second first-evaluation-model output can be subject to further post-processing prior to transmitting of the second first-evaluation-model-output instructions to the user interface 340, 341 (FIG. 3), as described further herein. In certain embodiments, the activity 410 (FIG. 5) of transmitting the second first-evaluation-model output instructions to the user interface 330, 331 (FIG. 3) can be performed by the communication system 320 (FIG. 3) which communicates model output instructions in relation to output from the model evaluation system 310, optionally in coordination with the control system 320. According to another embodiment, post-processing evaluations are performed on the output from the model evaluation system 310 (FIG. 3), for example by the post-processing assignment system 335 (FIG. 3) and post-processing evaluation system 315 (FIG. 3), and provide second first-evaluation model output instructions to the communication system 320 in relation to first first-evaluation model output generated by the model evaluation system 345 (FIG. 3).

Furthermore, according to certain embodiments, the method 400 (FIGS. 4-7) can continue by an activity 418 (FIG. 6) of, when it is determined, in real time, that the first evaluation model to be performed on the first processor is not capable of meeting the second evaluation criteria of the second task data for the second task job in the task queue, determining, in real time, whether the first evaluation model set to be performed on the first processor is capable of meeting any remaining evaluation criteria of any remaining task data for any remaining task job of the plurality of task jobs stored in the task queue, wherein the respective evaluation criteria comprise the any remaining evaluation criteria, and wherein the task data comprise the any remaining task data. That is, each of the task jobs in the task queue, including the third task job and up to the n-th task job, can be evaluated to see if their evaluation criteria is a fit with the first evaluation model set to be performed on the first processor. When it is determined that the first evaluation model set to be performed on the first processor is capable of meeting any of the third evaluation criteria of the third task job, and/or any other identified task job up to the n-th criteria of the n-th task job, the activities 414-417 (FIG. 6) can be repeated for the third or other identified task job, and namely receiving the third or other identified task data at the first processor, performing the first evaluation model on the third or other identified task data, outputting third or other identified first-evaluation model output, and transmitting third or other identified first-evaluation model output instructions to the user interface 330, 331 (FIG. 3). Furthermore, as the task queue is being repeatedly updated per activity 411 (FIG. 5) with the progress of processing of task jobs and/or new task jobs added to the task queue, the activity 418 (FIG. 6) of determining whether any remaining task jobs in the task queue include evaluation criteria that can be met by the first evaluation model can be continued according to any updates provided to the task queue. That is, the activity 418 can in certain embodiments be repeated when new task jobs are added to the task queue.

According to further embodiments herein, the method 400 (FIGS. 4-7) can continue after activity 418 (FIG. 6) with activity 419 (FIG. 7) of determining, in real time, whether a second evaluation model of the plurality of evaluation models set to be performed on a second processor of the plurality of respective processors is capable of meeting the first evaluation criteria of the first task data for the first task job in the task queue. That is, in certain embodiments, in addition to performing determinations of whether the first evaluation model set to be performed on the first processor can meet the evaluation criteria of any of the first through n-th task jobs stored in the task queue, the method 400 (FIGS. 4-7) can additionally and/or simultaneously include performing determinations of whether the second evaluation model set to be performed on the second processor can meet the criteria of any of the first through n-th task jobs stored in the task queue, and/or can additionally and/or simultaneously include performing such determinations for any other evaluation models (up to the n-th evaluation model) set to be performed on any of the plurality of processors.

According to embodiments herein, the method 400 (FIGS. 4-7) can further continue by activity 420 (FIG. 7) of when it is determined, in real time, that the second evaluation model set to be performed on the second processor is capable of meeting the first evaluation criteria of the first task data for the first task job in the task queue performing, in real time, the activities 421-424 (FIG. 7) for processing the first task data according to the second evaluation model, and transmitting output instructions to a user interface 330, 331 (FIG. 3). That is, the method 400 (FIGS. 4-7) can repeat the activities 407-410 (FIG. 5), but with the processing of the first task data with the second evaluation model instead of the first evaluation mode. According to some embodiments, the activity 420 and activities 421-424 can be performed by the model evaluation system 310 (FIG. 3) as described further herein, with activity 417 (FIG. 6) of transmitting instructions being performed by communication system 320 (FIG. 3), and optionally in collaboration with the control system 345 (FIG. 3).

Referring to FIG. 7, according to certain embodiments, when it is determined that the second evaluation model set to be performed on the second processor is capable of meeting the first evaluation criteria, the method 400 (FIGS. 4-7) can continue by the activity 421 (FIG. 7) of retrieving the first task data at the second processor. That is, the first task data of the first task job stored in the task queue can be retrieved and sent for processing and/or evaluation to the second processor. According to embodiments herein, the method 400 (FIGS. 4-7) can continue by the activity 422 (FIG. 7) of performing, on the second processor, the second evaluation model on the first task data. For example, the second evaluation model that has been determined to meet the evaluation criteria for the first task data is performed to evaluate the first task data and provide evaluation output. The method 400 (FIGS. 4-7) can further continue by the activity 423 (FIG. 7) of outputting first second-evaluation-model output in accordance with the first evaluation criteria for the first task job. For example, for a second evaluation model and first task job that specify evaluation of image data by an inference model to determine whether the image data contains potentially objectionable content, the first second-evaluation-model output can comprise information as to whether or not such potentially objectionable content was identified in evaluation of the first task data by the second evaluation model, and the nature of such potentially objectionable content. As another example, when the first evaluation model evaluates for explicit content, and the second evaluation model evaluates for violent content, a first first-evaluation-model output from evaluating first task data with the first evaluation model can comprise first first-evaluation-model output indicative of whether explicit content was found, whereas a first second-evaluation-model output from evaluating first task data with the second evaluation model can comprise first second-evaluation-model output indicative of whether violent content was found. According to certain embodiments, the activities 421-423 (FIG. 7) may be performed by the model evaluation system 310 (FIG. 3), for example in coordination with the control system 345 (FIG. 3) to receive first task data from the task queue, and provide the first second-evaluation model output in relation to the evaluation of the first task data with the second evaluation model.

According to embodiments herein, the method 400 (FIGS. 4-7) can continue by the activity 424 (FIG. 7) of transmitting first second-evaluation-model-output instructions to the user interface 330, 331 (FIG. 3) to provide first second-evaluation-model-output information to the user 350, 351 (e.g., reviewer) (FIG. 3) in relation to the first second-evaluation-model output. For example, the first second-evaluation-model-output instructions can be provided to the user 350, 351 to provide for review of the output, and determination as to next steps in processing. For example, the user 350, 351 (FIG. 3) can make determinations with respect to removal or blocking of content contained in the item data and associated with the item in the catalog, in a case where objectionable content has been identified by evaluation with the first evaluation model. According to one embodiment, the first second-evaluation-model output can be subject to further post-processing prior to transmitting of the first second-evaluation-model-output instructions to the user interface 340, 341 (FIG. 3), as described further herein. In certain embodiments, the activity 424 (FIG. 7) of transmitting the first second-evaluation-model output instructions to the user interface 330, 331 can be performed by the communication system 320 (FIG. 3) which communicates model output instructions in relation to output from the model evaluation system 310, optionally in coordination with the control system 320. According to another embodiment, post-processing evaluations are performed on the output from the model evaluation system 310 (FIG. 3), for example by the post-processing assignment system 335 (FIG. 3) and post-processing evaluation system 315 (FIG. 3), and provide first second-evaluation model output instructions to the communication system 320 in relation to first second-evaluation model output generated by the model evaluation system 345.

Furthermore, according to certain embodiments, the method 400 (FIGS. 4-7) can continue by an activity 425 (FIG. 7) of, when it is determined, in real time, that the second evaluation model to be performed on the second processor is not capable of meeting the first evaluation criteria of the first task job in the task queue, determining, in real time, whether the second evaluation model set to be performed on the second processor is capable of meeting any remaining evaluation criteria of any remaining task data for any remaining task job of the plurality of task jobs stored in the task queue. That is, each of the task jobs in the task queue, including the second task job and up to the n-th task job, can be evaluated to see if their evaluation criteria is a fit with the second evaluation model set to be performed on the second processor. When it is determined that the second evaluation model set to be performed on the second processor is capable of meeting any of the second evaluation criteria of the second task job, and/or any other identified task job up to the n-th criteria of the n-th task job, the activities 421-424 (FIG. 7) can be repeated for the second or other identified task job, and namely receiving the second or other identified task data at the second processor, performing the second evaluation model on the second or other identified task data, outputting second or other identified second-evaluation-model output, and transmitting second or other identified first-evaluation model output instructions to the user interface 330, 331 (FIG. 3). Furthermore, as the task queue is being repeatedly updated per activity 411 (FIG. 5) with the progress of processing of task jobs and/or new task jobs added to the task queue, the activity 425 (FIG. 7) of determining whether any remaining task jobs in the task queue include evaluation criteria that can be met by the second evaluation model can be continued according to any updates provided to the task queue. That is, the activity 425 (FIG. 7) can in certain embodiments be repeated when new task jobs are added to the task queue. Furthermore, according to certain embodiments, the method 400 (FIGS. 4-7) can continue by an activity 426 (FIG. 7) of determining whether any remaining evaluation models of the plurality of evaluation models set to be performed on any remaining processors of the plurality of respective processors are capable of meeting any evaluation criteria of the task data for any remaining task jobs of the plurality of task jobs in the task queue, wherein the respective evaluation criteria comprise the any evaluation criteria.

Furthermore, the activities 419-426 (FIG. 7) can also, in certain embodiments, be additionally and/or simultaneously performed with respect to third and up to n-th evaluation models set to be performed on the third and up to nth processor of the plurality of respective processors. That is, either simultaneously and/or in addition to determining whether the second evaluation model set to be performed on the second processor meets the criteria of the first task data for the first task job (or any remaining task data for any remaining task jobs) in the task queue, the same evaluation can be performed for this third and up to the n-th evaluation model set to be performed on the third and up to the n-th processor, and when the evaluation criteria is met the activities 421-424 (FIG. 7) can be performed for any of the third up to the n-th evaluation model for any of the task jobs for which the criteria has been determined to be met.

According to certain embodiments, certain post-processing evaluations can be performed on the evaluation model outputs, to output post-processing data that can be transmitted to users 350, 351 (FIG. 3) (e.g. reviewers) to provide information for review in determining next steps with respect to the item that has been evaluated by the evaluation model. According to certain embodiments a plurality of post-processing evaluations can comprise, for example, any one or more of determining whether to recommend user evaluation of an item in the catalog, determining whether to remove the item from the catalog, or determining whether to update item data related to the item in the catalog. Furthermore, according to certain embodiments, the output from the post-processing evaluations can be transmitted to a user 350, 351 (FIG. 3), and/or can be automatically processed to revise and/or update item data associated with an item in a retail catalog. For example, the output from the post-processing evaluations can be provided for manual review and determination of next steps by the user 305, 351, and/or identified content that is potentially unsuitable for retail customers can be automatically deleted and/or blocked from association with the item in the catalog.

In certain embodiments, the plurality of model evaluation outputs obtained from processing the task data with the plurality of evaluation models can be output to an output job queue that is similar to the task queue. In some embodiments, a method 600 (FIGS. 8-11) of providing post-processing comprises an activity 601 (FIG. 8) of outputting a plurality of evaluation model outputs to a plurality of output jobs in an output job queue, wherein the plurality of evaluation model outputs correspond to evaluations of the item data for each task job of the plurality of task jobs by the plurality of respective processors according to the plurality of evaluation models. According to certain embodiments, the output jobs output to the output job queue comprise the evaluation model out that is intended to be subject to post-processing. In some embodiments, the output job queue can comprise a distributed job queue that stores the output jobs across multiple machines and/or devices. The plurality of output jobs stored to the output job queue may be repeatedly updated, for example following outputting of new evaluation model outputs, and/or following completion of processing of output jobs in the output job queue. Referring to FIG. 3, according to certain embodiments the method 600 can be performed by the post processing assignment system 335 (FIG. 3), which is capable of assigning output jobs to the output job queue. In some embodiments, the control system 345 (FIG. 3) may be configured to monitor and track output jobs in the output job queue, for example to provide information to the post-processing assignment system 335 about assigning new output jobs to the output job queue, to provide information to the post-processing evaluation system 315 (FIG. 3) regarding output jobs available for processing and/or evaluation in the output job queue, and/or to confirm processing status of output jobs that are being processed by the post-processing evaluation system 315.

In certain embodiments, the method 600 (FIGS. 8-11) can continue by an activity 602 (FIG. 8) of repeatedly setting, in real time, a respective processor of a second plurality of processors to perform a respective post-processing evaluation from among a plurality of post-processing evaluations. The respective processor can be set to perform a predetermined post-processing evaluation for evaluating the output job to obtain a predetermined output. According to certain embodiments, the second plurality of respective processors can be set to each perform one of a plurality of different respective post-processing evaluations, such as for example a different post-processing evaluation for each processor. In some embodiments, a first set of processors can perform a first post-processing evaluation, and a second and further set of processors can perform second and further post-processing evaluations. In certain embodiments, the respective processors can be repeatedly set, in real time, to perform the respective post-processing evaluations, such that the processors can be re-set according to availability of the processor to perform a new post-processing evaluation, and/or to provide for post-processing evaluation of new and/or subsequent post-processing evaluation by the respective processors. In some embodiments, by setting each of the respective processors in the plurality of processors to perform the respective post-processing evaluation, a plurality of the processors can be available for processing and/or evaluation of the output jobs according to the plurality of different post-processing evaluations, thus providing for a variety of different analysis and/or outputs from processing of the output jobs. According to certain embodiments, the plurality of respective processors to which the post-processing evaluations can be set can comprise one or more of CPUs, GPUs or combinations thereof.

Referring to FIG. 3, in one embodiment the activity 602 (FIG. 8) can be performed by the post-processing evaluation system 315 (FIG. 3) which repeatedly sets, in real time, respective processors to perform the respective post-processing evaluations from among a plurality of post-processing evaluations. In some embodiments, the setting of the respective processors to perform the respective post-processing evaluations can be done in conjunction with control system 345 (FIG. 3), which can be configured to receive instructions from users 350, 351 (e.g., reviewers) with respect to which respective post-processing evaluations are intended to be performed with respect to the output jobs, and or for which types of output jobs. In certain embodiments, the respective post-processing evaluations that can be set to the respective processors can be retrieved from a post-processing evaluation database 362 (FIG. 3). For example, the control system 345 (FIG. 3) can be configured to retrieve post-processing evaluations from the post-processing evaluation database 361 in response to instructions from the users 350, 351 (e.g. reviewers), and communicate the post-processing evaluations to the post-processing evaluation system 315.

In certain embodiments, the method 600 (FIGS. 8-11) can continue by an activity 603 (FIG. 8) of processing the plurality of output jobs stored to the output job queue by determining, in real time, whether a first output job of the plurality of output jobs is compatible with the first post-processing evaluation set to be performed on the first processor of the second plurality of processors. That is, according to certain embodiments, the first post-processing evaluation set to be performed on a first processor is compared with the first output job to determine whether it is suitable for post-processing of the first output job. For example, it can be determined whether the first post-processing evaluation is capable of performing an evaluation set by the user 350, 351 (FIG. 3) for the output job, and/or whether it is capable of processing the type of evaluation model output contained in the output job. For example, for a first post-processing evaluation intended to evaluate whether the evaluation model output indicates an item contains item data associated therewith that should be removed, and automatically remove such item data, it may be determined whether the output job is of a type that permits such automatic determination that item data should be removed, as opposed to manual review by a reviewer. Referring to FIG. 3, in certain embodiments, the activity 603 (FIG. 8) can be performed by the post-processing evaluation system 315 (FIG. 3), for example in collaboration with the control system 345, by communicating with the post-processing assignment system 325 to evaluate and compare the output job stored in the output queue with the post-processing evaluation, and determine whether post-processing evaluations set to each of the respective processors are capable of providing suitable post-processing of the output jobs.

Returning to FIG. 8, in certain embodiments, the method 600 (FIGS. 8-11) can continue by an activity 604 (FIG. 8) of when it is determined, in real time, that the first output job is compatible with the first post-processing evaluation set to be performed on the first processor of the second plurality of processors, performing, in real time, performing, in real time the activities 605-608 (FIGS. 8-9) for processing the first output job according to the first post-processing evaluation, and transmitting post-processing data instructions to a user interface 330, 331 (FIG. 3). According to some embodiments, the activity 604 (FIG. 8) and activities 605-608 (FIGS. 8-9) can be performed by the post-processing evaluation system 310 (FIG. 3) as described further herein, with activity 609 (FIG. 9) of transmitting instructions being performed by communication system 320 (FIG. 3), and optionally in collaboration with the control system 345 (FIG. 3).

Referring to FIG. 8, according to certain embodiments, when it is determined, in real time, that the first output job is compatible with the first post-processing evaluation set to be performed on a first processor of the second plurality of processors, the method 600 (FIGS. 8-11) can continue by activity 605 (FIG. 8) of receiving the first output job at the first processor of the second plurality of processors. That is, the first evaluation model output of the first output job stored in the output job queue can be retrieved and sent for processing and/or evaluation to the first processor. According to embodiments herein, the method 600 (FIGS. 8-11) can continue by the activity 606 (FIG. 8) of performing, on the first processor, the first post-processing evaluation on the first output job. For example, the first post-processing model that has been determined to be compatible with the first output job is performed to evaluate the first output job and provide post-processing data for the first output job. The method 600 (FIGS. 8-12) can further continue by the activity 607 (FIG. 8) of outputting post-processing data for the first output job. According to certain embodiments, the activities 605-607 (FIG. 8) may be performed by the post-processing evaluation system 315 (FIG. 3), for example in coordination with the control system 345 to receive the first output job from the output job queue, and provide the first post-processing evaluation data in relation to the post-processing evaluation of the first output job with the first post-processing evaluation.

According to embodiments herein, the method 600 (FIGS. 8-11) can continue after activity 607 (FIG. 8) with the activity 608 (FIG. 9) of transmitting first first-post-processing-data instructions to update the user interface 330, 331 (FIG. 3) to provide first first-post-processing-data information to the user 350, 351 (e.g., reviewer) (FIG. 3) in relation to the first post-processing evaluation of the first output job. For example, the first post-processing data information can be provided to the user 350, 351 to provide for review of the output, and determination as to next steps in processing. For example, the user 350, 351 can make determinations with respect to removal or blocking of content contained in the item data and associated with the item in the catalog, in a case where objectionable content has been identified. In certain embodiments, the activity 608 (FIG. 9) of transmitting the first post-processing data instructions to the user interface 330, 331 can be performed by the communication system 320 (FIG. 3) which communicates posts-processing evaluation instructions in relation to output from the post-processing evaluation system 315, optionally in coordination with the control system 320.

According to embodiments herein, the method 600 (FIGS. 8-11) can continue by the activity 609 (FIG. 9) of repeatedly updating, in real time, the output job queue according to (i) a progress of processing the plurality of post-processing evaluations on the second plurality of processors, and (ii) an addition of any subsequently received output jobs to the task output job queue set to be performed on the second plurality of processors. According to one embodiment, the output job queue can be repeatedly updated in real time by communication between the post-processing evaluation system 315 and post-processing assignment system 335, for example by control system 345, to determine whether processing of an output job in the output job queue has been completed by the processor set to perform the first post-processing evaluation on the first output job. For example, when processing of the output job in the task queue has been completed, the output job can be deleted from the output job queue. Furthermore, as another example, completed output jobs in the output job queue can be replaced with new output jobs, specifying new evaluation model output for processing with one of the plurality of post-processing evaluations. According to certain embodiments, by repeatedly updating the output job queue in real time, the progress of output jobs can be monitored, such that the output job queue can be updated with new output jobs for performing by the respective processors, and output jobs that have been completed can be removed from the output job queue to allow for the addition of new output jobs to the output job queue. In the same or different embodiments, new output jobs can be added to the output job queue without having completed and/or removed any existing output job in the output job queue.

According to further embodiments herein, the method 600 (FIGS. 8-11) can continue after activity 609 (FIG. 9) with activity 610 (FIG. 10) of when it is determined, in real time, that the first output job is not compatible with the first post-processing evaluation set to be performed on the first processor of the second plurality of processors, determining, in real time, whether a second output job of the plurality of output jobs is compatible with the first post-processing evaluation of the plurality of post-processing evaluations. That is, when it is determined at activity 603 (FIG. 8) that the first post-processing evaluation set to be performed on the first processor is not compatible with the first output job, the method moves on to the second output job in the output job queue to determine whether the first post-processing evaluation set to be performed on the first processor is compatible with the second task job. According to embodiments herein, the method can continue to review the plurality of output jobs in the output job queue (e.g., a third output job, fourth out job, etc., up to an n-th output job stored in the output job queue) until an output job is located that is compatible with the first post-processing evaluation set to be performed on the first processor.

According to embodiments herein, the method 600 (FIGS. 8-11) can further continue by activity 611 (FIG. 6) of when it is determined, in real time, that the second output job is compatible with the first post-processing evaluation set to be performed on the first processor of the second plurality of processors, performing, in real time, the activities 612-615 (FIG. 10) for processing the second output job according to the first post-processing evaluation, and transmitting output instructions to a user interface 330, 331 (FIG. 3). That is, the method 600 (FIGS. 8-11) can repeat the activities 605-608 (FIGS. 8-9), but with the processing of the second output job with the first evaluation model instead of the first output job. According to some embodiments, the activity 611 (FIG. 10) and activities 612-614 (FIG. 10) can be performed by the post-processing evaluation system 315 (FIG. 3) as described further herein, with activity 615 (FIG. 10) of transmitting instructions being performed by communication system 320 (FIG. 3), and optionally in collaboration with the control system 345 (FIG. 3).

Referring to FIG. 10, according to certain embodiments, when it is determined that the first post-processing evaluation set to be performed on the first processor is compatible with the second output job, the method 600 (FIGS. 8-11) can continue by the activity 612 (FIG. 10) of receiving the second output job at the first processor of the second plurality of processors. That is, the second output job stored in the output job queue can be retrieved and sent for processing and/or evaluation to the first processor. According to embodiments herein, the method 600 (FIGS. 8-11) can continue by the activity 613 (FIG. 10) of performing, on the first processor of the second plurality of processors, the first post-processing evaluation on the second output job. The method 600 (FIGS. 8-11) can further continue by the activity 614 (FIG. 10) of outputting second first-post-processing data for the second output job. According to certain embodiments, the activities 612-614 (FIG. 10) may be performed by the post-processing evaluation system 315 (FIG. 3), for example in coordination with the control system 345 FIG. 3) to receive the second output job from the output job queue, and provide the second first-post-processing data in relation to the evaluation of the second output job with the first post-processing evaluation.

According to embodiments herein, the method 600 (FIGS. 8-11) can continue by the activity 615 (FIG. 10) of transmitting second first-post-processing-data instructions to update the user interface 330, 331 (FIG. 3) to provide second first-post-processing-data information to the user 350, 351 (e.g., reviewer) (FIG. 3) in relation to the first post-processing evaluation on the second output job. For example, the second first-post-processing data instructions can be provided to the user 350, 351 to provide for review of the output, and determination as to next steps in processing. For example, the user 350, 351 can make determinations with respect to removal or blocking of content contained in the item data and associated with the item in the catalog, in a case where objectionable content has been identified by evaluation with the an evaluation model. In certain embodiments, the activity 615 (FIG. 10) of transmitting the second first-post-processing-data instructions to the user interface 330, 331 can be performed by the communication system 320 (FIG. 3) which communicates post-processing instructions in relation to output from the post-processing evaluation system 315 (FIG. 3), optionally in coordination with the control system 320 (FIG. 3).

Furthermore, according to certain embodiments, the method 600 (FIGS. 8-12) can continue by an activity 616 (FIG. 10) of, when it is determined, in real time, that the second output job is not compatible with the first post-processing evaluation set to be performed on the first processor of the second plurality of processors, determining, in real-time, whether any remaining output job of the output job queue is compatible with the first post-processing evaluation set to be performed on the first processor of the second plurality of processors. That is, each of the output jobs in the output job queue, including the third output job and up to the n-th output job, can be evaluated to see if they are compatible with the first post-processing model set to be performed on the first processor. When it is determined that the first post-processing evaluation set to be performed on the first processor is compatible with any of the third output job, and/or any other identified output job up to the n-th output job, the activities 612-615 (FIG. 10) can be repeated for the third or other identified output job, and namely receiving the third or other identified output job at the first processor, performing the first post-processing evaluation on the third or other identified output data, outputting third or other identified first-post-processing data, and transmitting third or other identified first-post-processing-evaluation data instructions to the user interface 330, 331 (FIG. 3). Furthermore, as the output queue is being repeatedly updated per activity 609 (FIG. 9) with the progress of processing of output jobs and/or new output jobs added to the output queue, the activity 616 (FIG. 10) of determining whether any remaining output jobs in the output job queue are compatible with the first post-processing evaluation can be continued according to any updates provided to the output job queue. That is, the activity 616 (FIG. 10) can in certain embodiments be repeated when new out jobs are added to the output j ob queue.

According to further embodiments herein, the method 600 (FIGS. 8-11) can continue after activity 616 (FIG. 10) with activity 617 (FIG. 11) of determining, in real time, whether the first output job is compatible with a second post-processing evaluation set to be performed on a second processor of the second plurality of processors. That is, in certain embodiments, in addition to performing determinations of whether the first post-processing evaluation set to be performed on the first processor is compatible with any of the first through n-th output jobs stored in the output job queue, the method 600 (FIGS. 8-11) can additionally and/or simultaneously include performing determinations of whether the second post-processing evaluation set to be performed on the second processor is compatible with any of the first through n-th output jobs stored in the output job queue, and/or can additionally and/or simultaneously include performing such determinations for any other post-processing evaluation s (up to the n-th post-processing evaluation) set to be performed on any of the plurality of processors.

According to embodiments herein, the method 600 (FIGS. 8-11) can further continue by activity 618 (FIG. 11) of when it is determined that the first output job is compatible with the second post-processing evaluation set to be performed on the first processor of the second plurality of processors, performing, in real time, the activities 619-622 (FIG. 11) for processing the first output data according to the second post-processing evaluation, and transmitting post-processing data instructions to a user interface 330, 331 (FIG. 3). That is, the method 600 (FIGS. 8-11) can repeat the activities 605-608 (FIGS. 8-9), but with the processing of the first output job with the second post-processing evaluation instead of the first post-processing mode. According to some embodiments, the activity 618 (FIG. 11) and activities 619-622 (FIG. 11) can be performed by the post-processing evaluation system 315 (FIG. 3) as described further herein, with activity 622 (FIG. 11) of transmitting instructions being performed by communication system 320 (FIG. 3), and optionally in collaboration with the control system 345 (FIG. 3).

Referring to FIG. 11, according to certain embodiments, when it is determined that the second post-processing evaluation is compatible with the first output job, the method 600 (FIGS. 8-11) can continue by the activity 619 (FIG. 11) of receiving the first output job at the second processor of the second plurality of processors. That is, the first output job stored in the output queue can be retrieved and sent for processing and/or evaluation to the second processor. According to embodiments herein, the method 600 (FIGS. 8-11) can continue by an activity 620 (FIG. 11) of performing, on the second processor, the second post-processing evaluation of the first output job. The method 600 (FIGS. 8-11) can further continue by the activity 621 (FIG. 11) of outputting first second-post-processing data instructions for the first output job. According to certain embodiments, the activities 619-621 (FIG. 11) may be performed by the post-processing evaluation system 315 (FIG. 3), for example in coordination with the control system 345 to receive the first output job from the output job queue, and provide the first second-post-processing data in relation to the evaluation of the first output job with the second post-processing evaluation.

According to embodiments herein, the method 600 (FIGS. 8-11) can continue by the activity 622 (FIG. 11) of transmitting first second-post-processing-data instructions to update the user interface 330, 331 (FIG. 3) to provide first second-post-processing-data information to the user 350, 351 (e.g., reviewer) (FIG. 3) in relation to the first second-post-processing evaluation on the first output job. For example, the first second-post-processing data instructions can be provided to the user 350, 351 to provide for review of the output, and determination as to next steps in processing. For example, the user 350, 351 can make determinations with respect to removal or blocking of content contained in the item data and associated with the item in the catalog, in a case where objectionable content has been identified by evaluation with an evaluation model. In certain embodiments, the activity 622 (FIG. 11) of transmitting the first second-post-processing data instructions to the user interface 330, 331 can be performed by the communication system 320 (FIG. 3) which communicates instructions in relation to output from the post-processing evaluation system 315 (FIG. 3), optionally in coordination with the control system 320 (FIG. 3).

Furthermore, according to certain embodiments, the method 600 (FIGS. 8-12) can continue by an activity 623 (FIG. 11) of, when it is determined, in real time, that the first output job is not compatible with the second post-processing evaluation set to be performed on the second processor of the second plurality of processors, determining, in real time, whether any remaining output job of the output job queue is compatible with the second post-processing evaluation set to be performed on the second processor of the second plurality of processors. That is, each of the output jobs in the output queue, including the second output job and up to the n-th output job, can be evaluated to see if they are compatible with the second post-processing evaluation set to be performed on the second processor. When it is determined that the second post-processing evaluation set to be performed on the second processor is with any of the second output job, and/or any other identified output job up to the n-th output job, the activities 619-622 (FIG. 11) can be repeated for the second or other identified output job, and namely receiving the second or other identified output job at the second processor, performing the second post-processing evaluation on the second or other identified output job, outputting second or other identified second-post-processing data, and transmitting second or other identified second-post-processing data instructions to the user interface 330, 331 (FIG. 3). Furthermore, as the output job queue is being repeatedly updated per activity 610 (FIG. 9) with the progress of processing of output jobs and/or new output jobs added to the output job queue, the activity 623 (FIG. 11) of determining whether any remaining output jobs are compatible with the second post-processing evaluation can be continued according to any updates provided to the output job queue. That is, the activity 623 (FIG. 11) can in certain embodiments be repeated when new output jobs are added to the output job queue.

Furthermore, the method 600 (FIGS. 8-11) can further comprise activity 624 (FIG. 11) of determining in real-time, whether any output job of the output job queue is compatible with any remaining post-processing evaluations of the plurality of post-processing evaluations set to be performed on any remaining processor of the second plurality of processors. That is, according to certain embodiments, the activities 619-622 (FIG. 11) can also, be additionally and/or simultaneously performed with respect to third and up to n-th post-processing evaluations set to be performed on the third and up to nth processor of the plurality of respective processors. That is, either simultaneously and/or in addition to determining whether the second post-processing evaluation set to be performed on the second processor is compatible with first output job (or any remaining output jobs) in the task queue, the same evaluation can be performed for this third and up to the n-th post-processing evaluation set to be performed on the third and up to the n-th processor, and when the output job is compatible the activities 619-622 (FIG. 11) can be performed for any of the third up to the n-th post-processing evaluation for any of the output jobs for which there is compatibility.

According to yet a further embodiment, the system and/or methods described herein may be capable of scaling to meet processing demands, for example with the amount of data to be processed increases, or when processing with a certain type of evaluation model and/or processing a certain type of item data is time-intensive. According to one embodiment, a method 800 (FIG. 12) can comprise an activity 801 (FIG. 12) of determining, in real time, whether the plurality of respective processors is adequate to accommodate the task jobs in the task job queue. That is, it can be determined in real time whether the first plurality of processors that are set to perform evaluation models on the task jobs are sufficient to perform this processing, or whether further processing capability is needed to meet predetermined throughput speeds for model evaluations. Similarly, it can be determined in real time whether the second plurality of processors that are set to perform post-processing evaluation on the output jobs are sufficient to perform this processing, or whether further processing capability is needed to meet predetermined throughput speeds for post-processing.

The method 800 (FIG. 12) can further comprise an activity 802 (FIG. 12) of selectively adding or removing one or more processors in the plurality of respective processors according to a result of determination as to whether the plurality of respective processors are adequate to accommodate the task jobs. For example, if more processing power is needed, then processors can be added, and if processing power exceeds what is needed, processors can be removed from processing. For example, processors can be added for processing a particular evaluation model, a particular post-processing evaluation, a particular task job, and/or a particular output job. For example, if a particular evaluation model requires further processing power, then additional processors can be added and have the particular evaluation model set to be performed on the additional processor, to increase the speed of evaluation with the model. Processors can also be dynamically added and/or switched between models, and/or between post-processing evaluations. Processors can also be dynamically added and/or switched between model evaluations to and/or from post-processing evaluations. According to certain aspects, the method 800 (FIG. 12) comprises an activity 803 (FIG. 12) of, when adding one or more processors to the plurality of respective processors, setting the one or more processors to perform a selected evaluation model from among the plurality of evaluation models when adding to the plurality of respective processors. That is, the method can comprise setting the one or more processors to perform a selected evaluation model from among a plurality of evaluation models when adding to the first plurality of processors, and/or setting the one or more processors to perform a selected post-processing evaluation from among the plurality of post-processing evaluations when adding to the second plurality of processors.

In some embodiments, the activities described herein for any of the methods 400, 600 and/or 800 can comprise using a distributed network comprising distributed memory architecture to perform the associated activity. This distributed architecture can reduce the impact on the network and system resources to reduce congestion in bottlenecks while still allowing data to be accessible from a central location. Use of distributed networks are especially applicable in processing large numbers of datasets, as computation of large numbers of datasets can reduce processing speeds and increase processing burdens on single processor computer systems.

In many embodiments, the evaluation models used herein can be obtained by training a machine learning algorithm on one or more combined digital images. In some embodiments, training a machine learning algorithm can comprise estimating internal parameters of a model configured to identify items shown in a digital image. In various embodiments, a machine learning algorithm can be trained using labeled training data, otherwise known as a training dataset. In this way, a machine learning algorithm can be configured to identify an unknown item in a digital image. In the same or different embodiments, a machine learning algorithm can comprise a deep learning algorithm. In the same or different embodiments, a pre-trained machine learning algorithm can be used, and the pre-trained algorithm can be re-trained on the labeled training data. In some embodiments, the machine learning model can also consider both historical and dynamic input from the catalog database 360 (FIG. 3). In this way, a machine learning algorithm can be trained iteratively as data from the catalog database 360 is added to a training data set. In many embodiments, a machine learning algorithm can be iteratively trained in real time as data is added to a training data set.

Figure 13:
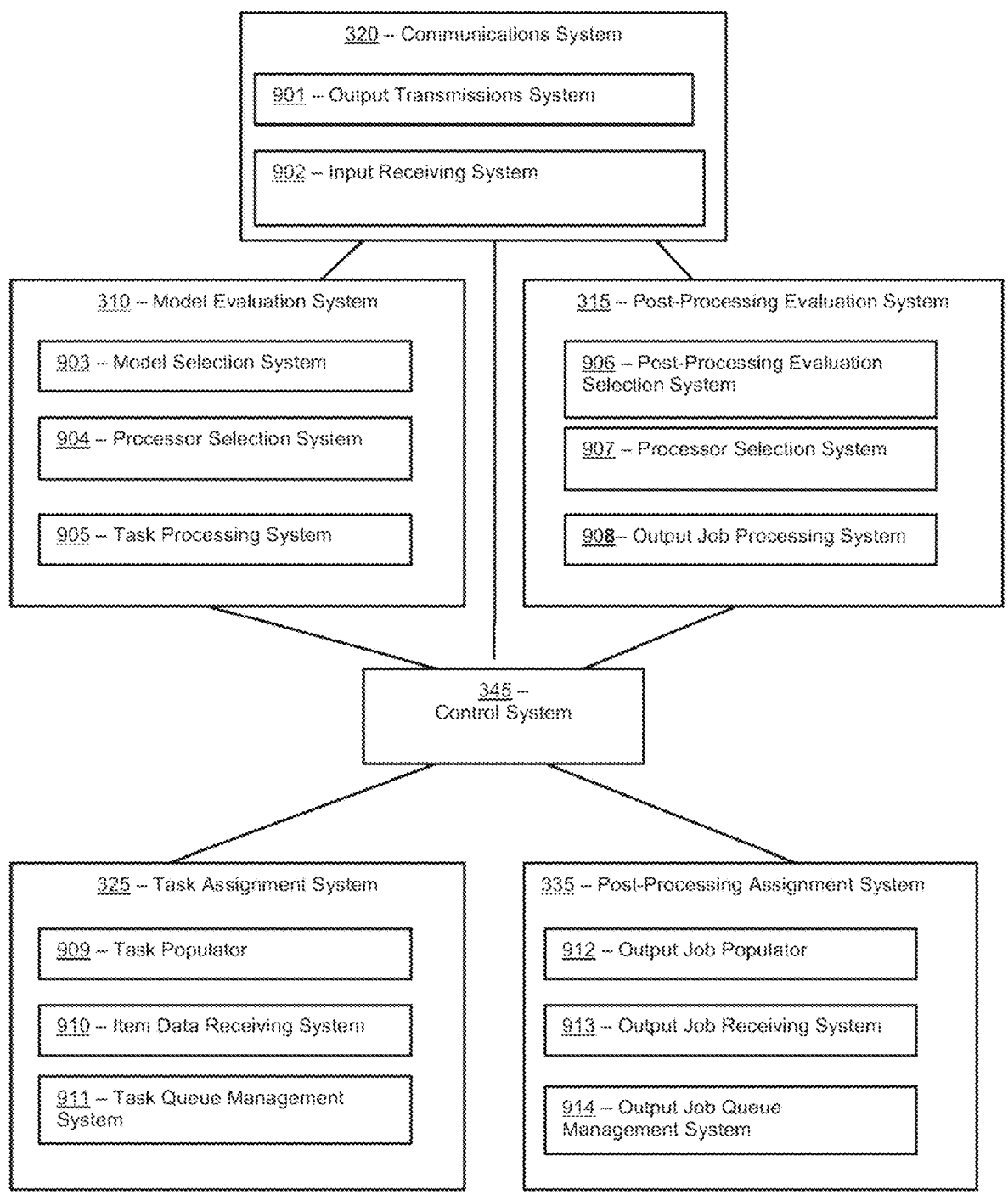
FIG. 13 illustrates a representative block diagram of a system, according to an additional embodiment.

Turning ahead in the drawings, FIG. 13 illustrates a block diagram of a system 300 that can be employed for performing embodiments of the methods and/or activities described herein. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can comprise non-transitory memory storage module 320. Memory storage module 320 can be referred to as communications system 320. In many embodiments, the communications module 320 can store computing instructions configured to run on one or more processing modules and perform one or more acts of methods 400 and 600 (FIGS. 4-11) (e.g., activity 410 (FIG. 5)), activity 424 (FIG. 7), activity 608 (FIG. 9), and activity 615 (FIG. 10). The communications system 320 can further comprise an output transmission system 901 to transmit output from the system, such as to a user 350, 351 (FIG. 3). The communications system 320 (FIG. 13) can further comprise input receiving system 902 to receive input from a user 350, 351 (FIG. 3).

In many embodiments, system 300 can comprise non-transitory memory storage module 345. Memory storage module 345 can be referred to as the control system 345. In many embodiments, control system 345 can store computing instructions configured to run on one or more processing modules and perform one or more acts of method 400 (FIGS. 4-7), 600 (FIGS. 8-11) and/or 800 (FIG. 12), such as for example by providing communications and control between the model evaluation system 310, task assignment system 325, post-processing evaluation system 315, and post-processing assignment system 335. For example, the control system 345 can perform one or more acts of method 800 (FIG. 12) (e.g., activities 801-803 (FIG. 12)).

In many embodiments, system 300 can comprise non-transitory memory storage module 310. Memory storage module 310 can be referred to as model evaluation system 310. In many embodiments, model evaluation system 310 can store computing instructions configured to run on one or more processing modules and perform one or more acts of method 400, 600 and/or 800 (FIGS. 4-12) (e.g., activities 404-405 (FIG. 4), activities 406-409 (FIG. 5), activities 412-418 (FIG. 6), activities 419-425 (FIG. 7)). The model evaluation system 310 can further comprise, in certain embodiments, model selection system 903 for selecting an evaluation model for evaluation of task data, processor selection system 904 to select processors to perform the evaluation model, and a task processing system 310 to process tasks jobs with the evaluation model set to be performed on the processor.

In many embodiments, system 300 can comprise non-transitory memory storage module 325. Memory storage module 325 can be referred to as task assignment system 325. In many embodiments, task assignment system 325 can store computing instructions configured to run on one or more processing modules and perform one or more acts of method 400, 600 and/or 800 (FIGS. 4-12) (e.g., activities 401-403 (FIG. 4), and activity 411 (FIG. 5)). The task assignment system 310 can further comprise, in certain embodiments, a task populator 909 to set task jobs to a task job queue, item data receiving system 910 to receive item data for use in populating the task job queue with task jobs, and a task queue management system 911 to monitor and update status of the task jobs in the task job queue.

In many embodiments, system 300 can comprise non-transitory memory storage module 315. Memory storage module 315 can be referred to as post-processing evaluation system 315. In many embodiments, post-processing evaluation system 315 can store computing instructions configured to run on one or more processing modules and perform one or more acts of method 400, 600 and/or 800 (FIGS. 4-12) (e.g., activities 603-607 (FIG. 8), activities 610-616 (FIG. 10), and activities 617-624 (FIG. 11)). The post-processing evaluation system 315 can further comprise, in certain embodiments, post-processing evaluation selection system 906 for selecting a post-processing evaluation model for evaluation of an output job, processor selection system 907 to select processors to perform the post-processing evaluation, and output job processing system 908 to process output jobs with the post-processing evaluation set to be performed on the processor.

In many embodiments, system 300 can comprise non-transitory memory storage module 335. Memory storage module 335 can be referred to as post-processing assignment system 335. In many embodiments, post-processing assignment system 335 can store computing instructions configured to run on one or more processing modules and perform one or more acts of method 400, 600 and/or 800 (FIGS. 4-12) (e.g., activities 601-602 (FIG. 8), and activity 609 (FIG. 9)). The post-processing assignment system 335 can further comprise, in certain embodiments, an output job populator 912 to set output jobs to an output job queue, output job receiving system 913 to receive output jobs for use in populating the output job queue with output jobs, and an output job queue management system 914 to monitor and update status of the output jobs in the output job queue.

Although systems and methods for processing of catalog items with a plurality of models have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-14 may be modified, and that the foregoing discussion of certain of these embodiments does not necessarily represent a complete description of all possible embodiments. For example, one or more of the procedures, processes, or activities of FIGS. 4-12 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable storage devices storing computing instructions configured to run on the one or more processors and perform:
receiving item data for each item of a plurality of items from a catalog comprising a set of items;
assigning a task for evaluation of the item data for each item of the plurality of items, wherein each task for evaluation of the item data specifies respective evaluation criteria;
storing a plurality of task jobs to a task queue, wherein the plurality of task jobs comprises task data, and wherein the task data comprise the item data and the tasks for evaluation of the item data;
repeatedly setting, in real time, a respective processor of a plurality of respective processors to perform a respective evaluation model from among a plurality of evaluation models;
processing the plurality of task jobs stored to the task queue, by:
determining, in real time, whether a first evaluation model of the plurality of evaluation models set to be performed on a first processor of the plurality of respective processors is capable of meeting first evaluation criteria of first task data for a first task job of the plurality of task jobs in the task queue, wherein the respective evaluation criteria comprise the first evaluation criteria, and wherein the task data comprise the first task data;
when it is determined, in real time, that the first evaluation model set to be performed on the first processor is capable of meeting the first evaluation criteria of the first task data for the first task job in the task queue, performing, in real time:
receiving the first task data at the first processor, wherein the first task data comprise first item data and a first task for evaluation of a second item data;
performing, on the first processor, the first evaluation model on the first task data; and
outputting first first-evaluation-model output in accordance with the first evaluation criteria for the first task job;
when it is determined, in real time, that a first output job is compatible with a first post-processing evaluation set to be performed on a first processor of a second plurality of processors, performing, in real time:
receiving the first output job at the first processor of the second plurality of processors;
performing, on the first processor of the second plurality of processors, the first post-processing evaluation of the first output job; and
outputting first first-post-processing data for the first output job;
transmitting (i) first first-evaluation-model-output instructions to a user interface to provide first first-evaluation-model-output information to a user in relation to the first first-evaluation-model output, and (ii) first first-post-processing-data instructions to update the user interface to provide first first-post-processing-data information to the user in relation to the first post-processing evaluation of the first output job; and
repeatedly updating, in real time, (a) the task queue according to (i) a progress of processing the plurality of task jobs by the plurality of evaluation models on the plurality of respective processors, and (ii) an addition of any subsequently received task jobs to the task queue for evaluation of subsequently received item data corresponding to subsequently received items, and (b) an output job queue according to (i) a progress of processing a plurality of post-processing evaluations on the second plurality of processors, and (ii) an addition of any subsequently received output jobs to a task output job queue set to be performed on the second plurality of processors.

2. The system of claim 1, wherein the computing instructions are further configured to run on the one or more processors and perform:
when it is determined, in real time, that the first evaluation model set to be performed on the first processor is not capable of meeting the first evaluation criteria of the first task data for the first task job in the task queue, determining, in real time, whether the first evaluation model set to be performed on the first processor is capable of meeting second evaluation criteria, as specified, of second task data for a second task job of the plurality of task jobs in the task queue, wherein the respective evaluation criteria comprise the second evaluation criteria, and wherein the task data comprise the second task data,
when it is determined, in real time, that the first evaluation model set to be performed on the first processor is capable of meeting the second evaluation criteria of the second task data for the second task job in the task queue, performing, in real time:
receiving the second task data at the first processor, wherein the second task data comprise second item data and a second task for evaluation of the second item data;
performing, on the first processor, the first evaluation model on the second task data;
outputting second first-evaluation-model output in accordance with the second evaluation criteria for the second task job, and
transmitting second first-evaluation-model-output instructions to the user interface to provide second first-evaluation-model-output information to the user in relation to the second first-evaluation-model-output, and
when it is determined, in real time, that the first evaluation model to be performed on the first processor is not capable of meeting the second evaluation criteria of the second task data for the second task job in the task queue, determining, in real time, whether the first evaluation model set to be performed on the first processor is capable of meeting any remaining evaluation criteria of any remaining task data for any remaining task job of the plurality of task jobs stored in the task queue, wherein the respective evaluation criteria comprise the any remaining evaluation criteria, and wherein the task data comprise the any remaining task data.

3. The system of claim 2, wherein the computing instructions are further configured to run on the one or more processors and perform:
determining, in real time, whether a second evaluation model of the plurality of evaluation models set to be performed on a second processor of the plurality of respective processors is capable of meeting the first evaluation criteria of the first task data for the first task job in the task queue, when it is determined, in real time, that the second evaluation model set to be performed on the second processor is capable of meeting the first evaluation criteria of the first task data for the first task job in the task queue, performing, in real time:
receiving the first task data at the second processor;
performing, on the second processor, the second evaluation model on the first task data,
outputting first second-evaluation-model-output in accordance with the first evaluation criteria for the first task job, and
transmitting first second-evaluation-model-output instructions to the user interface to provide first second-evaluation-model-output information to the user in relation to the first second-evaluation model-output, when it is determined, in real time, that the second evaluation model set to be performed on the second processor is not capable of meeting the first evaluation criteria of the first task data for the first task job in the task queue, determining, in real time, whether the second evaluation model set to be performed on the second processor is capable of meeting any remaining evaluation criteria of any remaining task data of any remaining task jobs of the plurality of task jobs stored in the task queue, and determining whether any remaining evaluation models of the plurality of evaluation models set to be performed on any remaining processors of the plurality of respective processors are capable of meeting any evaluation criteria of the task data for any remaining task jobs of the plurality of task jobs in the task queue, wherein the respective evaluation criteria comprise the any evaluation criteria.

4. The system of claim 1, wherein the computing instructions are further configured to run on the one or more processors to perform:
outputting a plurality of evaluation model outputs to a plurality of output jobs in the output job queue, wherein the plurality of evaluation model outputs correspond to evaluations of the item data for each task job of the plurality of task jobs by the plurality of respective processors according to the plurality of evaluation models;
repeatedly setting, in real time, a respective processor of the second plurality of processors to perform a respective post-processing evaluation from among the plurality of post-processing evaluations; and
processing the plurality of output jobs stored to the output job queue by:
determining, in real time, whether the first output job of the plurality of jobs is compatible with the first post-processing evaluation set to be performed on the first processor of the second plurality of processors.

5. The system of claim 4, wherein the computing instructions are further configured to run on the one or more processors and perform:
when it is determined, in real time, that the first output job is not compatible with the first post-processing evaluation set to be performed on the first processor of the second plurality of processors, determining, in real time, whether a second output job of the plurality of output jobs is compatible with the first post-processing evaluation set to be performed on the first processor of the second plurality of processors, when it is determined, in real time, that the second output job is compatible with the first post-processing evaluation set to be performed on the first processor of the second plurality of processors, performing, in real time:
receiving the second output job at the first processor of the second plurality of processors;
performing, on the first processor of the second plurality of processors, the first post-processing evaluation of the second output job;
outputting second first-post-processing data for the second output job; and
transmitting second first-post-processing-data instructions to update the user interface to provide second-first-post-processing-data information to the user in relation to the first post-processing evaluation of the second output job; and when it is determined, in real time, that the second output job is not compatible with the first post-processing evaluation set to be performed on the first processor of the second plurality of processors, determining, in real-time, whether any remaining output job of the output job queue is compatible with the first post-processing evaluation set to be performed on the first processor of the second plurality of processors.

6. The system of claim 5, wherein the computing instructions are further configured to run on the one or more processors and perform:
determining, in real time, whether the first output job is compatible with a second post-processing evaluation set to be performed on a second processor of the second plurality of processors,
when it is determined that the first output job is compatible with the second post-processing evaluation set to be performed on the second processor of the second plurality of processors, performing, in real time:
receiving the first output job at the second processor of the second plurality of processors;
performing, on the second processor, the second post-processing evaluation of the first output job,
outputting first second-post-processing data for the first output job; and
transmitting first second-post-processing-data instructions to update the user interface to provide first second-post-processing-data information to the user in relation to the first second-post-processing evaluation of the first output job; and
when it is determined, in real time, that the first output job is not compatible with the second post-processing evaluation set to be performed on the second processor of the second plurality of processors, determining, in real time, whether any remaining output job of the output job queue is compatible with the second post-processing evaluation set to be performed on the second processor of the second plurality of processors, and
determining, in real-time, whether any output job of the output job queue is compatible with any remaining post-processing evaluations of the plurality of post-processing evaluations set to be performed on any remaining processor of the second plurality of processors.

7. The system of claim 4, wherein the plurality of post-processing evaluations comprises any one or more of determining whether to recommend user evaluation of an item in the catalog, determining whether to remove the item from the catalog, or determining whether to update item data related to the item in the catalog.

8. The system of claim 1, wherein the plurality of respective processors comprises one or more of CPUs, GPUs, and combinations thereof.

9. The system of claim 1, wherein the item data comprise one or more of image data for the plurality of items, image web addresses for the plurality of items, or item identification numbers and item descriptions for the plurality of items, and wherein the plurality of evaluation models comprises a plurality of inference models.

10. The system of claim 1, wherein the computing instructions are further configured to run on the one or more processors and perform:
determining, in real time, whether the plurality of respective processors is adequate to accommodate the task jobs in the task queue;
selectively adding or removing one or more processors in the plurality of respective processors according to a result of determination as to whether the plurality of respective processors are adequate to accommodate the task jobs; and
when adding one or more processors to the plurality of respective processors, setting the one or more processors to perform a selected evaluation model from among the plurality of evaluation models when adding to the plurality of respective processors.

11. A method being implemented via execution of computing instructions configured to run at a plurality of processors and stored at one or more non-transitory computer-readable media, the method comprising:
receiving item data for each item of a plurality of items from a catalog comprising a set of items;
assigning a task for evaluation of the item data for each item of the plurality of items, wherein each task for evaluation of the item data specifies respective evaluation criteria;
storing a plurality of task jobs to a task queue, wherein the plurality of task jobs comprises task data, and wherein the task data comprise the item data and the tasks for evaluation of the item data;
repeatedly setting, in real time, a respective processor of a plurality of respective processors to perform a respective evaluation model from among a plurality of evaluation models;
processing the plurality of task jobs stored to the task queue, by:
determining, in real time, whether a first evaluation model of the plurality of evaluation models set to be performed on a first processor of the plurality of respective processors is capable of meeting first evaluation criteria of first task data for a first task job of the plurality of task jobs in the task queue, wherein the respective evaluation criteria comprise the first evaluation criteria, and wherein the task data comprise the first task data;
when it is determined, in real time, that the first evaluation model set to be performed on the first processor is capable of meeting the first evaluation criteria of the first task data for the first task job in the task queue, performing, in real time:
receiving the first task data at the first processor, wherein the first task data comprise first item data and a first task for evaluation of a second item data;
performing, on the first processor, the first evaluation model on the first task data; and
outputting first first-evaluation-model output in accordance with the first evaluation criteria for the first task job;
when it is determined, in real time, that a first output job is compatible with a first post-processing evaluation set to be performed on a first processor of a second plurality of processors, performing, in real time:
receiving the first output job at the first processor of the second plurality of processors;
performing, on the first processor of the second plurality of processors, the first post-processing evaluation of the first output job; and
outputting first first-post-processing data for the first output job;
transmitting (i) first first-evaluation-model-output instructions to a user interface to provide first first-evaluation-model-output information to a user in relation to the first first-evaluation-model output, and (ii) first first-post-processing-data instructions to update the user interface to provide first first-post-processing-data information to the user in relation to the first post-processing evaluation of the first output job; and
repeatedly updating, in real time, (a) the task queue according to (i) a progress of processing the plurality of task jobs by the plurality of evaluation models on the plurality of respective processors, and (ii) an addition of any subsequently received task jobs to the task queue for evaluation of subsequently received item data corresponding to subsequently received items, and (b) an output job queue according to (i) a progress of processing a plurality of post-processing evaluations on the second plurality of processors, and (ii) an addition of any subsequently received output jobs to a task output job queue set to be performed on the second plurality of processors.

12. The method of claim 11, further comprising:
when it is determined, in real time, that the first evaluation model set to be performed on the first processor is not capable of meeting the first evaluation criteria of the first task data for the first task job in the task queue, determining, in real time, whether the first evaluation model set to be performed on the first processor is capable of meeting second evaluation criteria, as specified, of second task data for a second task job of the plurality of task jobs in the task queue, wherein the respective evaluation criteria comprise the second evaluation criteria, and wherein the task data comprise the second task data,
when it is determined, in real time, that the first evaluation model set to be performed on the first processor is capable of meeting the second evaluation criteria of the second task data for the second task job in the task queue, performing, in real time:
receiving the second task data at the first processor, wherein the second task data comprise second item data and a second task for evaluation of the second item data;
performing, on the first processor, the first evaluation model on the second task data
outputting second first-evaluation-model output in accordance with the second evaluation criteria for the second task job, and
transmitting second first-evaluation-model-output instructions to the user interface to provide second first-evaluation-model-output information to the user in relation to the second first-evaluation-model-output, and when it is determined, in real time, that the first evaluation model to be performed on the first processor is not capable of meeting the second evaluation criteria of the second task data for the second task job in the task queue, determining, in real time, whether the first evaluation model set to be performed on the first processor is capable of meeting any remaining evaluation criteria of any remaining task data for any remaining task job of the plurality of task jobs stored in the task queue, wherein the respective evaluation criteria comprise the any remaining evaluation criteria, and wherein the task data comprise the any remaining task data.

13. The method of claim 12, further comprising:
determining, in real time, whether a second evaluation model of the plurality of evaluation models set to be performed on a second processor of the plurality of respective processors is capable of meeting the first evaluation criteria of the first task data for the first task job in the task queue,
when it is determined, in real time, that the second evaluation model set to be performed on the second processor is capable of meeting the first evaluation criteria of the first task data for the first task job in the task queue, performing, in real time:
  receiving the first task data at the second processor;
  performing, on the second processor, the second evaluation model on the first task data,
  outputting first second-evaluation-model-output in accordance with the first evaluation criteria for the first task job, and
  transmitting first second-evaluation-model-output instructions to the user interface to provide first second-evaluation-model-output information to the user in relation to the first second-evaluation model-output,
when it is determined, in real time, that the second evaluation model set to be performed on the second processor is not capable of meeting the first evaluation criteria of the first task data for the first task job in the task queue, determining, in real time, whether the second evaluation model set to be performed on the second processor is capable of meeting any remaining evaluation criteria of any remaining task data of any remaining task jobs of the plurality of task jobs stored in the task queue, and
determining whether any remaining evaluation models of the plurality of evaluation models set to be performed on any remaining processors of the plurality of respective processors are capable of meeting any evaluation criteria of the task data for any remaining task jobs of the plurality of task jobs in the task queue, wherein the respective evaluation criteria comprise the any evaluation criteria.

14. The method of claim 11, further comprising:
outputting a plurality of evaluation model outputs to a plurality of output jobs in the output job queue, wherein the plurality of evaluation model outputs correspond to evaluations of the item data for each task job of the plurality of task jobs by the plurality of respective processors according to the plurality of evaluation models;
repeatedly setting, in real time, a respective processor of the second plurality of processors to perform a respective post-processing evaluation from among the plurality of post-processing evaluations; and
processing the plurality of output jobs stored to the output job queue by:
  determining, in real time, whether the first output job of the plurality of jobs is compatible with the first post-processing evaluation set to be performed on the first processor of the second plurality of processors.

15. The method of claim 14, further comprising:
when it is determined, in real time, that the first output job is not compatible with the first post-processing evaluation set to be performed on the first processor of the second plurality of processors, determining, in real time, whether a second output job of the plurality of output jobs is compatible with the first post-processing evaluation set to be performed on the first processor of the second plurality of processors,
when it is determined, in real time, that the second output job is compatible with the first post-processing evaluation set to be performed on the first processor of the second plurality of processors, performing, in real time:
  receiving the second output job at the first processor of the second plurality of processors;
  performing, on the first processor of the second plurality of processors, the first post-processing evaluation of the second output job;
  outputting second first-post-processing data for the second output job; and
  transmitting second first-post-processing-data instructions to update the user interface to provide second-first-post-processing-data information to the user in relation to the first post-processing evaluation of the second output job; and
when it is determined, in real time, that the second output job is not compatible with the first post-processing evaluation set to be performed on the first processor of the second plurality of processors, determining, in real-time, whether any remaining output job of the output job queue is compatible with the first post-processing evaluation set to be performed on the first processor of the second plurality of processors.

16. The method of claim 15, further comprising:
determining, in real time, whether the first output job is compatible with a second post-processing evaluation set to be performed on a second processor of the second plurality of processors,
when it is determined that the first output job is compatible with the second post-processing evaluation set to be performed on the second processor of the second plurality of processors, performing, in real time:
  receiving the first output job at the second processor of the second plurality of processors;
  performing, on the second processor, the second post-processing evaluation of the first output job,
  outputting first second-post-processing data for the first output job; and
  transmitting first second-post-processing-data instructions to update the user interface to provide first second-post-processing-data information to the user in relation to the first second-post-processing evaluation of the first output job; and
when it is determined, in real time, that the first output job is not compatible with the second post-processing evaluation set to be performed on the second processor of the second plurality of processors, determining, in real time, whether any remaining output job of the output job queue is compatible with the second post-processing evaluation set to be performed on the second processor of the second plurality of processors, and determining, in real-time, whether any output job of the output job queue is compatible with any remaining post-processing evaluations of the plurality of post-processing evaluations set to be performed on any remaining processor of the second plurality of processors.

17. The method of claim 14, wherein the plurality of post-processing evaluations comprises any one or more of determining whether to recommend user evaluation of an item in the catalog, determining whether to remove the item from the catalog, or determining whether to update item data related to the item in the catalog.

18. The method of claim 11, wherein the plurality of respective processors comprises one or more of CPUs, GPUs, and combinations thereof.

19. The method of claim 11, wherein the item data comprise one or more of image data for the plurality of items, image web addresses for the plurality of items, or item identification numbers and item descriptions for the plurality of items, and wherein the plurality of evaluation models comprises a plurality of inference models.

20. The method of claim 11, further comprising:

determining, in real time, whether the plurality of respective processors is adequate to accommodate the task jobs in the task queue;

selectively adding or removing one or more processors in the plurality of respective processors according to a result of determination as to whether the plurality of respective processors are adequate to accommodate the task jobs; and when adding one or more processors to the plurality of respective processors, setting the one or more processors to perform a selected evaluation model from among the plurality of evaluation models when adding to the plurality of respective processors.

* * * * *